(12) United States Patent
Sundaresan et al.

(10) Patent No.: US 11,088,855 B2
(45) Date of Patent: Aug. 10, 2021

(54) SYSTEM AND METHOD FOR VERIFYING AN IDENTITY OF A USER USING A CRYPTOGRAPHIC CHALLENGE BASED ON A CRYPTOGRAPHIC OPERATION

(71) Applicant: Workday, Inc., Pleasanton, CA (US)

(72) Inventors: Prakash Sundaresan, Redmond, WA (US); Lionello G. Lunesu, New Territories (HK); Antoine Cote, Sheung Wan (HK)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 16/282,111

(22) Filed: Feb. 21, 2019

(65) Prior Publication Data

US 2019/0190724 A1   Jun. 20, 2019
US 2021/0152374 A9   May 20, 2021

Related U.S. Application Data

(63) Continuation-in-part of application No. 16/147,842, filed on Sep. 30, 2018, now Pat. No. 10,700,861, (Continued)

(51) Int. Cl.
*H04L 9/32* (2006.01)
*H04L 9/06* (2006.01)

(52) U.S. Cl.
CPC .......... *H04L 9/3271* (2013.01); *H04L 9/0637* (2013.01); *H04L 9/3226* (2013.01); *H04L 9/3239* (2013.01); *H04L 9/3247* (2013.01)

(58) Field of Classification Search
CPC ............... H04L 9/3213; H04L 63/0807; H04L 63/0823; H04L 9/0825; H04L 9/3247
See application file for complete search history.

(56) References Cited

U.S. PATENT DOCUMENTS

| | | | |
|---|---|---|---|
| 6,950,948 B2 * | 9/2005 | Neff ........................ | H04L 9/006 705/12 |
| 7,360,094 B2 * | 4/2008 | Neff ...................... | H04L 9/0825 705/12 |

(Continued)

FOREIGN PATENT DOCUMENTS

GB    2539430    7/2015

OTHER PUBLICATIONS

Andreas M. Antonopoulos, "Mastering Bitcoin Programming the Open Blockchain", Jun. 1, 2017, O'Reilly, 2nd Edition, Chapter 5 (Year: 2017).

(Continued)

*Primary Examiner* — Ellen Tran
(74) *Attorney, Agent, or Firm* — Van Pelt, Yi & James LLP

(57) ABSTRACT

A processor-implemented system and method for enabling a relying party device associated with a relying party to verify an identity of a user. The method includes the steps of (i) generating, using a cryptographic processor on a user device associated with the user, a first set of credentials including a public-private key pair associated with the user, (ii) receiving at least one cryptographic challenge from the relying party device associated with the relying party, (iii) verifying at least one of a biometric or a PIN code, (iv) responding to the at least one cryptographic challenge by performing the at least one cryptographic operation on the cryptographic challenge using the user private key to form a result of the at least one cryptographic operation and (v) transmitting the result of the at least one cryptographic operation as a cryptographic challenge response to the relying party device.

24 Claims, 19 Drawing Sheets

Related U.S. Application Data which is a continuation-in-part of application No. 15/662,417, filed on Jul. 28, 2017, now Pat. No. 10,637,665, application No. 16/282,111, which is a continuation-in-part of application No. 15/973,479, filed on May 7, 2018, now Pat. No. 10,715,312, and a continuation-in-part of application No. 15/973,446, filed on May 7, 2018, which is a continuation-in-part of application No. 15/961,791, filed on Apr. 24, 2018, now Pat. No. 10,735,197, which is a continuation-in-part of application No. 15/662,417, filed on Jul. 28, 2017, now Pat. No. 10,637,665, application No. 16/282,111, which is a continuation-in-part of application No. 15/973,468, filed on May 7, 2018, now Pat. No. 10,715,311, and a continuation-in-part of application No. 15/662,417, filed on Jul. 28, 2017, now Pat. No. 10,637,665.

(60) Provisional application No. 62/368,875, filed on Jul. 29, 2016, provisional application No. 62/489,772, filed on Apr. 25, 2017, provisional application No. 62/557,331, filed on Sep. 12, 2017, provisional application No. 62/503,107, filed on May 8, 2017.

(56) References Cited

U.S. PATENT DOCUMENTS

| | | |
|---|---|---|
| 9,397,980 B1 | 7/2016 | Chen |
| 2004/0236693 A1 | 11/2004 | Quesselaire |
| 2008/0010449 A1 | 1/2008 | Holtzman |
| 2010/0138652 A1 | 6/2010 | Sela |
| 2013/0096943 A1* | 4/2013 | Carey .................... G06Q 10/10 705/2 |
| 2016/0027229 A1* | 1/2016 | Spanos .................. G07C 13/00 705/51 |
| 2016/0086175 A1 | 3/2016 | Finlow-Bates |
| 2016/0261411 A1 | 9/2016 | Yau |
| 2016/0275461 A1 | 9/2016 | Sprague |
| 2017/0147808 A1 | 5/2017 | Kravitz |
| 2017/0155513 A1 | 6/2017 | Acar |
| 2017/0180128 A1 | 6/2017 | Lu |
| 2017/0222815 A1 | 8/2017 | Meriac |
| 2017/0344988 A1 | 11/2017 | Cusden |
| 2017/0357966 A1 | 12/2017 | Chandrasekhar |
| 2018/0006826 A1 | 1/2018 | Smith |
| 2018/0276666 A1 | 9/2018 | Haldenby |
| 2018/0288033 A1 | 10/2018 | Kamal |
| 2019/0197815 A1 | 6/2019 | Kamal |
| 2019/0222422 A1 | 7/2019 | Purves |
| 2019/0266334 A1 | 8/2019 | Robison |

OTHER PUBLICATIONS

Biryukov et al., "Argon2: new generation of memory-hard functions for password hashing and other applications", 2016, IEEE, pp. 292-300 (Year 2016).

* cited by examiner

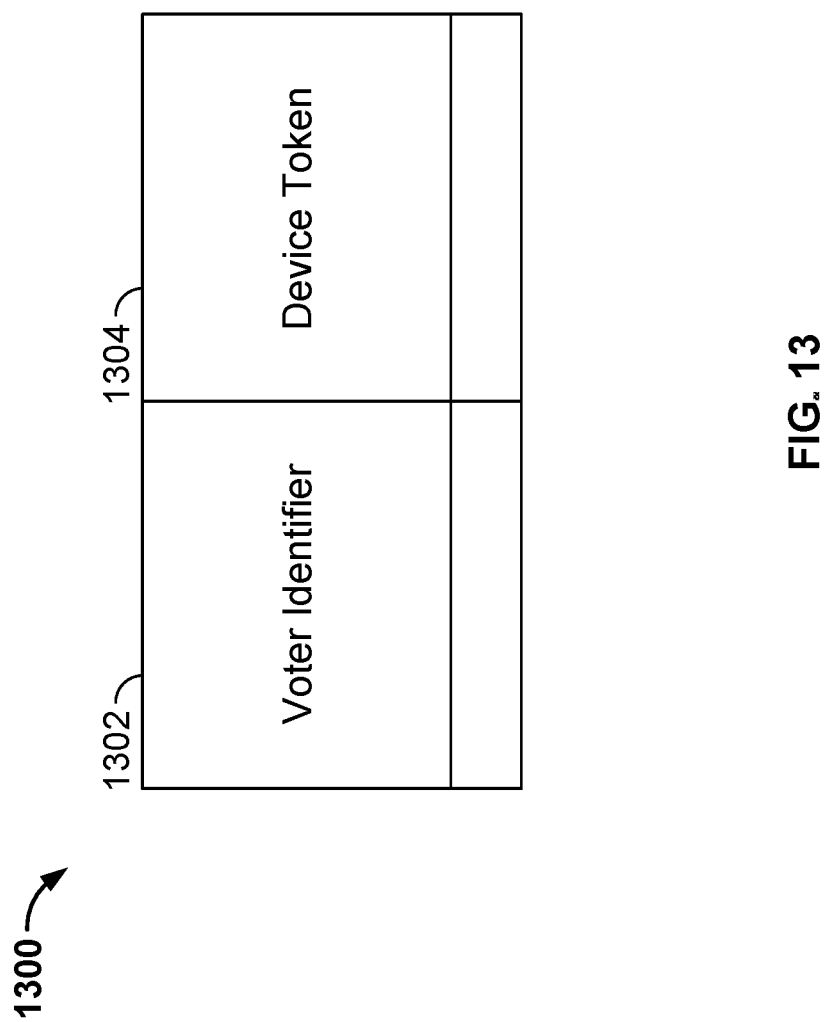

SYSTEM AND METHOD FOR VERIFYING AN IDENTITY OF A USER USING A CRYPTOGRAPHIC CHALLENGE BASED ON A CRYPTOGRAPHIC OPERATION

CROSS-REFERENCE TO RELATED APPLICATIONS

This application is a continuation in part of U.S. patent application Ser. No. 16/147,842, entitled SYSTEM AND METHOD FOR GENERATING A RECOVERY KEY AND MANAGING CREDENTIALS USING A SMART BLOCKCHAIN CONTRACT filed Sep. 30, 2018, now U.S. Pat. No. 10,700,861, which is incorporated herein by reference for all purposes, which claims priority to U.S. Provisional Application No. 62/557,331, entitled REVOCATION AND RECOVERY IN A DIGITAL IDENTITY MANAGEMENT SYSTEM filed Sep. 12, 2017 which is incorporated herein by reference for all purposes, and is a continuation in part of U.S. patent application Ser. No. 15/662,417 entitled BLOCKCHAIN-BASED DIGITAL IDENTITY MANAGEMENT (DIM) SYSTEM filed Jul. 28, 2017, now U.S. Pat. No. 10,637,665, which is incorporated herein by reference for all purposes, which claims priority to U.S. Provisional Application No. 62/489,772, entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes and claims priority to U.S. Provisional Application No. 62/368,875, entitled TRUSTED KEY BLOCKCHAIN-BASED IDENTITY MANAGEMENT SYSTEM TOWARDS A WORLD OF STRONG IDENTITY, SECURITY AND SMART CONTRACTS filed Jul. 29, 2016 which is incorporated herein by reference for all purposes. This application is a continuation in part of U.S. patent application Ser. No. 15/973,479, entitled SYSTEM AND METHOD FOR BLOCKCHAIN-BASED DEVICE AUTHENTICATION BASED ON A CRYPTOGRAPHIC CHALLENGE filed May 7, 2018 which is incorporated herein by reference for all purposes, which claims priority to U.S. Provisional Application No. 62/503,107, entitled ADDITIONAL SCENARIOS FOR BLOCKCHAIN-BASED CREDENTIAL AND TOKEN MANAGEMENT IN THE TRUSTED KEY IDENTITY SYSTEM filed May 8, 2017 which is incorporated herein by reference for all purposes, and is a continuation in part of U.S. patent application Ser. No. 15/961,791, entitled BLOCKCHAIN-BASED SECURE CREDENTIAL AND TOKEN MANAGEMENT ACROSS MULTIPLE DEVICES filed Apr. 24, 2018 which is incorporated herein by reference for all purposes, which claims priority to U.S. Provisional Application No. 62/489,772, entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes and is a continuation in part of U.S. patent application Ser. No. 15/662,417 entitled BLOCKCHAIN-BASED DIGITAL IDENTITY MANAGEMENT (DIM) SYSTEM filed Jul. 28, 2017, now U.S. Pat. No. 10,637,665, which is incorporated herein by reference for all purposes, which claims priority to U.S. Provisional Application No. 62/489,772, entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes and claims priority to U.S. Provisional Application No. 62/368,875, entitled TRUSTED KEY BLOCKCHAIN-BASED IDENTITY MANAGEMENT SYSTEM TOWARDS A WORLD OF STRONG IDENTITY, SECURITY AND SMART CONTRACTS filed Jul. 29, 2016 which is incorporated herein by reference for all purposes. Said U.S. patent application Ser. No. 15/973,479 is a continuation in part of U.S. patent application Ser. No. 15/662,417 entitled BLOCKCHAIN-BASED DIGITAL IDENTITY MANAGEMENT (DIM) SYSTEM filed Jul. 28, 2017, now U.S. Pat. No. 10,637,665, which is incorporated herein by reference for all purposes, which claims priority to U.S. Provisional Application No. 62/489,772, entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes and claims priority to U.S. Provisional Application No. 62/368,875, entitled TRUSTED KEY BLOCKCHAIN-BASED IDENTITY MANAGEMENT SYSTEM TOWARDS A WORLD OF STRONG IDENTITY, SECURITY AND SMART CONTRACTS filed Jul. 29, 2016 which is incorporated herein by reference for all purposes. This application is a continuation in part of U.S. patent application Ser. No. 15/973,446, entitled SYSTEM AND METHOD FOR PAYMENT TRANSACTION AUTHENTICATION BASED ON A CRYPTOGRAPHIC CHALLENGE filed May 7, 2018 which is incorporated herein by reference for all purposes, which claims priority to U.S. Provisional Application No. 62/503,107, entitled ADDITIONAL SCENARIOS FOR BLOCKCHAIN-BASED CREDENTIAL AND TOKEN MANAGEMENT IN THE TRUSTED KEY IDENTITY SYSTEM filed May 8, 2017 which is incorporated herein by reference for all purposes, and is a continuation in part of U.S. Patent application Ser. No. 15/961,791, entitled ADDITIONAL SCENARIOS FOR BLOCKCHAIN-BASED CREDENTIAL AND TOKEN MANAGEMENT IN THE TRUSTED KEY IDENTITY SYSTEM filed Apr. 24, 2018 which is incorporated herein by reference for all purposes, which claims priority to U.S. Provisional Application No. 62/489,772, entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes and is a continuation in part of U.S. patent application Ser. No. 15/662,417 entitled BLOCKCHAIN-BASED DIGITAL IDENTITY MANAGEMENT (DIM) SYSTEM filed Jul. 28, 2017, now U.S. Pat. No. 10,637,665, which is incorporated herein by reference for all purposes, which claims priority to U.S. Provisional Application No. 62/489,772, entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes and claims priority to U.S. Provisional Application No. 62/368,875, entitled TRUSTED KEY BLOCKCHAIN-BASED IDENTITY MANAGEMENT SYSTEM TOWARDS A WORLD OF STRONG IDENTITY, SECURITY AND SMART CONTRACTS filed Jul. 29, 2016 which is incorporated herein by reference for all purposes. Said U.S. patent application Ser. No. 15/973,446 is a continuation in part of U.S. patent application Ser. No. 15/662,417 entitled BLOCKCHAIN-BASED DIGITAL IDENTITY MANAGEMENT (DIM) SYSTEM filed Jul. 28, 2017, now U.S. Pat. No. 10,637,665, which is incorporated herein by reference for all purposes, which claims priority to U.S. Provisional Application No. 62/489,772, entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes and claims priority to U.S. Provisional Application No. 62/368,875, entitled TRUSTED KEY BLOCKCHAIN-BASED IDENTITY MANAGEMENT SYSTEM TOWARDS A WORLD OF STRONG IDENTITY, SECURITY AND SMART CONTRACTS filed Jul. 29, 2016 which is incorporated herein by reference for all purposes. This application is a continuation in part of U.S. patent application Ser. No. 15/973,468, entitled SYSTEM AND METHOD FOR BLOCKCHAIN-BASED USER AUTHENTICATION BASED ON A CRYPTOGRAPHIC CHALLENGE filed May 7, 2018 which is incorporated herein by reference for all purposes, which claims priority to U.S. Provisional Application No. 62/503,107, entitled ADDITIONAL SCENARIOS FOR BLOCKCHAIN-BASED CREDENTIAL AND TOKEN MANAGEMENT IN THE TRUSTED KEY IDENTITY SYSTEM filed May 8, 2017 which is incorporated herein by reference for all purposes, and is a continuation in part of U.S. patent application Ser. No. 15/961,791, entitled BLOCKCHAIN-BASED SECURE CREDENTIAL AND TOKEN MANAGEMENT ACROSS MULTIPLE DEVICES filed Apr. 24, 2018 which is incorporated herein by reference for all purposes, which claims priority to U.S. Provisional Application No. 62/489,772, entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes and is a continuation in part of U.S. patent application Ser. No. 15/662,417 entitled BLOCKCHAIN-BASED DIGITAL IDENTITY MANAGEMENT (DIM) SYSTEM filed Jul. 28, 2017, now U.S. Pat. No. 10,637,665, which is incorporated herein by reference for all purposes, which claims priority to U.S. Provisional Application No. 62/489,772, entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes and claims priority to U.S. Provisional Application No. 62/368,875, entitled TRUSTED KEY BLOCKCHAIN-BASED IDENTITY MANAGEMENT SYSTEM TOWARDS A WORLD OF STRONG IDENTITY, SECURITY AND SMART CONTRACTS filed Jul. 29, 2016 which is incorporated herein by reference for all purposes. Said U.S. patent application Ser. No. 15/973,468 is a continuation in part of U.S. patent application Ser. No. 15/662,417 entitled BLOCKCHAIN-BASED DIGITAL IDENTITY MANAGEMENT (DIM) SYSTEM filed Jul. 28, 2017, now U.S. Pat. No. 10,637,665, which is incorporated herein by reference for all purposes, which claims priority to U.S. Provisional Application No. 62/489,772, entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes and claims priority to U.S. Provisional Application No. 62/368,875, entitled TRUSTED KEY BLOCKCHAIN-BASED IDENTITY MANAGEMENT SYSTEM TOWARDS A WORLD OF STRONG IDENTITY, SECURITY AND SMART CONTRACTS filed Jul. 29, 2016 which is incorporated herein by reference for all purposes. This application is a continuation in part of U.S. patent application Ser. No. 15/961,791, entitled BLOCKCHAIN-BASED SECURE CREDENTIAL AND TOKEN MANAGEMENT ACROSS MULTIPLE DEVICES filed Apr. 24, 2018 which is incorporated herein by reference for all purposes, which claims priority to U.S. Provisional Application No. 62/489,772, entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes and is a continuation in part of U.S. patent application Ser. No. 15/662,417 entitled BLOCKCHAIN-BASED DIGITAL IDENTITY MANAGEMENT (DIM) SYSTEM filed Jul. 28, 2017, now U.S. Pat. No. 10,637,665, which is incorporated herein by reference for all purposes, which claims priority to U.S. Provisional Application No. 62/489,772, entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes and claims priority to U.S. Provisional Application No. 62/368,875, entitled TRUSTED KEY BLOCKCHAIN-BASED IDENTITY MANAGEMENT SYSTEM TOWARDS A WORLD OF STRONG IDENTITY, SECURITY AND SMART CONTRACTS filed Jul. 29, 2016 which is incorporated herein by reference for all purposes. This application is a continuation in part of U.S. patent application Ser. No. 15/662,417 entitled BLOCKCHAIN-BASED DIGITAL IDENTITY MANAGEMENT (DIM) SYSTEM filed Jul. 28, 2017, now U.S. Pat. No. 10,637,665, which is incorporated herein by reference for all purposes, which claims priority to U.S. Provisional Application No. 62/489,772, entitled BLOCKCHAIN-BASED CREDENTIAL AND TOKEN MANAGEMENT IN THE TRUSTED KEY IDENTITY SYSTEM filed Apr. 25, 2017 which is incorporated herein by reference for all purposes and claims priority to U.S. Provisional Application No. 62/368,875, entitled TRUSTED KEY BLOCKCHAIN-BASED IDENTITY MANAGEMENT SYSTEM TOWARDS A WORLD OF STRONG IDENTITY, SECURITY AND SMART CONTRACTS filed Jul. 29, 2016 which is incorporated herein by reference for all purposes.

BACKGROUND

Technical Field

Embodiments of this disclosure generally relate to verify an identity of a user, and more particularly, to a system and method for performing at least one cryptographic operation on a cryptographic challenge using a user private key and transmitting a result of the at least one cryptographic operation to a relying party device.

Description of the Related Art

Most existing systems that require user authentication in order to be accessed employ the use of a simple password or PIN to authenticate the user. Preferably, in one aspect, the password should be such that the user should be able to remember it easily. However, in another aspect, in order for the password to be secure, it should be long and difficult to predict, which in turn makes it hard to remember. Since passwords are required to access a multitude of applications and devices, users typically end up using the same password with one or more minor variations for multiple applications so that he/she has to remember a fewer number of passwords. However, security best practices recommend that unrelated passwords should be used for different applications. Consequently, a compromise or hacking at one website or application which has poor security practices may lead to a compromise of the user's accounts at other websites or applications where the user has used the same or a closely-related password. For this reason, there are illicit websites that even offer misappropriated username-password credentials for sale.

Verifying the identify of a user or an information identifier associated with the user is critical for a variety of applications, such as for accessing a bank account, verifying employment records, insurance, a license, a lender etc., and a compromise in security by a hacker, or access by an unauthorized user can have disastrous consequences for the user as well as for the party that is providing access. User authentication and identity verification are also important in scenarios that involve voting, to verify that a user who has voted is the same as a voter who is eligible to vote. Accordingly, there remains a need for improving on existing approaches for verifying an identity of a user to improve security, for a variety of applications.

SUMMARY

In view of the foregoing, embodiments herein provide a processor-implemented method for enabling a relying party device associated with a relying party to verify an identity of a user. The method includes the steps of (i) generating, using a cryptographic processor on a user device associated with the user, a first set of credentials including a public-private key pair associated with the user, (ii) receiving at least one cryptographic challenge from the relying party device associated with the relying party, (iii) verifying at least one of a biometric or a PIN code by comparing the at least one of the biometric or the PIN code with at least one of a previously registered biometric associated with the user or a previously registered PIN code associated with the user, and if the at least one of the biometric or the PIN code matches the at least one of the previously registered biometric associated with the user or the previously registered PIN code associated with the user, making a user private key available for executing at least one cryptographic operation, (iv) responding to the at least one cryptographic challenge by performing the at least one cryptographic operation on the cryptographic challenge using the user private key to form a result of the at least one cryptographic operation and (v) transmitting the result of the at least one cryptographic operation as a cryptographic challenge response to the relying party device. The public-private key pair includes a user public key and the user private key. The user private key is restricted to the cryptographic processor on the user device. The at least one cryptographic challenge includes or is derived from a pseudorandom value. The result is derived from or includes the pseudorandom value.

In some embodiments, the method further includes the steps of (i) obtaining an identity token from an identity authority, (ii) securely signing the identity token with an identity authority private key, by an identity authority device associated with the identity authority, (iii) encrypting the identity token with the user public key, by the identity authority device, to obtain an encrypted identity token and (iv) registering an identity authority public key with an internet certificate authority, by the identity authority device. In some embodiments, the identity authority possesses an identity authority signature key pair that includes the identity authority public key and the identity authority private key. In some embodiments, the identity token includes the user public key, a unique identifier of the identity token, and at least one identity attribute. In some embodiments, the identity token securely attests to at least one of an identity document, a verified legal identity, a government issued identity, or the at least one identity attribute.

In some embodiments, the method further includes the steps of (i) decrypting the encrypted identity token, with the user private key, at the user device, to obtain the identity token, (ii) providing at least one of the verified legal identity, the government issued identity, or the at least one identity attribute that the identity token securely attests to, by the user device, to the relying party device and (iii) verifying with the internet certificate authority, by the relying party device, if the identity token was issued by the identity authority.

In some embodiments, the at least one identity attribute is selected from a photograph of the user, a video of the user, an information identifier in the identity document, an information identifier in the verified legal identity, and an information identifier in the government issued identity. In some embodiments, the identity document is selected from a student identity proof, an employment proof, or an insurance card, and the government issued identity is selected from a voter identity document or a passport. In some embodiments, the information identifier may be a name, an address, a date of birth, a social security number, a voter registration number, etc. The information identifier is associated with the user, however it need not be unique to the user.

In some embodiments, the method further includes the steps of (i) embedding the identity token into an electronic document and cryptographically signing the electronic document with the user private key, by the user device and (ii) extracting the identity token from the electronic document, by the relying party device. In some embodiments, the at least one cryptographic challenge is sent to the user device associated with the user public key that is associated with the identity token to verify that the user public key associated with the identity token corresponds to the user private key used to sign the electronic document.

In some embodiments, the method further includes the steps of (i) storing a record on an alert database and (ii) receiving a transaction request on behalf of the user associated with the record on the alert database, by the relying party device. In some embodiments, the record is signed using the user private key. In some embodiments, the relying party device sends the cryptographic challenge response to the user device associated with the first set of credentials and authorizes the transaction request only if the transaction request was signed using the first set of credentials.

In some embodiments, receiving the at least one cryptographic challenge includes receiving an encrypted pseudorandom value that is derived from the pseudorandom value by encrypting the pseudorandom value with the user public key from the identity token, at the relying party device, and performing the at least one cryptographic operation on the at least one cryptographic challenge for responding to the at least one cryptographic challenge includes decrypting the encrypted pseudorandom value, at the first device, and the result of the at least one cryptographic operation performed on the cryptographic challenge includes the pseudorandom value that is returned to the relying party device as the cryptographic challenge response.

In some embodiments, receiving the at least one cryptographic challenge includes receiving a pseudorandom value from the relying party device, performing the at least one cryptographic operation on the at least one cryptographic challenge for responding to the at least one cryptographic challenge includes encrypting the pseudorandom value, and the result of the of the at least one cryptographic operation performed on the at least one cryptographic challenge includes an encrypted pseudorandom value. In some embodiments, the relying party device decrypts the encrypted pseudorandom value from the cryptographic challenge response to obtain the pseudorandom value.

In some embodiments, receiving the at least one cryptographic challenge includes receiving a pseudorandom value from the relying party device, performing the at least one cryptographic operation on the at least one cryptographic challenge for responding to the at least one cryptographic challenge includes signing the pseudorandom value with the user private key, and the result of the of the at least one cryptographic operation performed on the at least one cryptographic challenge includes a signed pseudorandom value. In some embodiments, the relying party device verifies a signature of the pseudorandom value from the cryptographic challenge response.

In some embodiments, the identity authority retains a copy of the identity token, and the at least one identity attribute of the identity token is unpublished on a blockchain. In some embodiments, none of the identity attributes are published on the blockchain.

In some embodiments, the method further includes the steps of (i) generating a digital signature, with the cryptographic processor of the user device, using the user private key and (ii) implementing a blockchain smart contract that is written in a native programming language of the blockchain that verifies the digital signature that is generated on the user device. In some embodiments, the first set of credentials enable the user to sign at least one transaction on the blockchain.

In some embodiments, the at least one cryptographic challenge is communicated to the user device by uniquely identifying the user device based on a 1-1 mapping from the user public key to the user device.

In some embodiments, the method further includes the step of registering the user public key on a public blockchain, or registering the user public key on a permissioned blockchain.

In some embodiments, the method further includes the step of registering a credential revocation list contract with a blockchain. In some embodiments, the credential revocation list contract enables the first set of credentials generated on the user device to be revoked by a second set of credentials generated on a second user device.

In some embodiments, the credential revocation list contract includes a revokee table that stores at least one public key of a revokee device and at least one public key of a corresponding authorized revoker device. In some embodiments, if a registered authorized revoker device calls the credential revocation list contract to revoke credentials of the revokee device, a revocation transaction is digitally signed and recorded on the blockchain, and a revocation message is recorded against a public key address of the revokee device.

In some embodiments, the method further incudes the step of registering an identity token revocation list contract with a blockchain. In some embodiments, the identity authority that issues the identity token sends a message to a user public key address to which the identity token was issued, to revoke the identity token. In some embodiments, the message sent by the identity authority includes a token id of the identity token.

In some embodiments, the relying party is governed by a blockchain smart contract by implementing a registrar code in the blockchain smart contract. In some embodiments, the blockchain smart contract includes (i) a voter table that is represented as an object and (ii) at least one method that obtains a ballot as an input from a sponsoring entity. In some embodiments, each row of the voter table includes at least one voter identifier.

In some embodiments, the registrar code specifies (i) sending the ballot to each registered voter for the ballot, (ii) verifying that votes are received only from registered voters and (iii) forwarding the votes that are received to the sponsoring entity.

In some embodiments, the method further incudes the steps of (i) obtaining a signed ballot from the relying party device, at the user device, (ii) populating the signed ballot with at least one vote, (iii) generating a pseudorandom identifier, (iv) encrypting the signed ballot and the pseudorandom identifier with the sponsoring entity public key to obtain an encrypted package and (v) communicating the encrypted package and an identity token of the user that attests to a verified identity of the user, from the user device to the relying party device. In some embodiments, the relying party device is associated with a registrar. In some embodiments, a ballot is generated by a sponsoring entity device associated with a sponsoring entity. In some embodiments, the sponsoring entity device is associated with a sponsoring entity public key and the sponsoring entity private key. In some embodiments, the ballot is digitally signed with the sponsoring entity private key to generate the signed ballot.

In some embodiments, the method further incudes the steps of (i) receiving the signed ballot from the sponsoring entity, at the relying party device, (ii) verifying the signed ballot with a list of eligible voters for an election that is stored in a relying party device database to determine a first eligible voter, (iii) communicating the signed ballot to the user device associated with the first eligible voter, (iv) receiving the encrypted package and the identity token of the user that attests to the verified identity of the user from the user device, (v) verifying that the ballot is signed by the user by verifying the identity token of the user that attests to a verified identity of the user and (vi) communicating an encrypted completed ballot to the sponsoring entity device. In some embodiments, the first eligible voter is the user, and the first eligible voter is associated with the user device.

In some embodiments, the method further incudes the steps of (i) communicating the signed ballot to the relying party device, (ii) receiving the encrypted completed ballot from the relying party device, (iii) decrypting the encrypted completed ballot using the sponsoring entity private key and (iv) publishing the ballot, the vote and the pseudorandom identifier associated with the vote in a public database.

In another aspect, one or more non-transitory computer readable storage mediums storing one or more sequences of instructions, which when executed by one or more processors, causes a method for enabling a relying party device associated with a relying party to verify an identity of a user is provided. The method includes the steps of: (i) receiving at least one cryptographic challenge from the relying party device associated with the relying party, (ii) verifying at least one of a biometric or a PIN code by comparing the at least one of the biometric or the PIN code with at least one of a previously registered biometric associated with the user or a previously registered PIN code associated with the user that was previously registered for the user, and if the at least one of the biometric or the PIN code matches the at least one of the previously registered biometric associated with the user or the previously registered PIN code associated with the user, making a user private key available for executing at least one cryptographic operation, (iii) responding to the at least one cryptographic challenge by performing the at least one cryptographic operation on the at least one cryptographic challenge using the user private key to form a result of the at least one cryptographic operation and (iv) transmitting the result of the at least one cryptographic operation to the relying party device as a cryptographic challenge response. The at least one cryptographic challenge includes or is derived from a pseudorandom value. The result is derived from or includes the pseudorandom value.

In some embodiments, a first set of credentials are generated using a cryptographic processor on a user device associated with the user, the first set of credentials including a public-private key pair associated with the user. In some embodiments, the public-private key pair includes a user public key and the user private key. In some embodiments, the user private key is restricted to the cryptographic processor on the user device. In some embodiments, the identity authority retains a copy of the identity token, and the at least one identity attribute of the identity token is unpublished on a blockchain.

In some embodiments, the method further incudes the steps of (i) obtaining a signed ballot from the relying party device, at the user device, (ii) populating the signed ballot with at least one vote, (iii) generating a pseudorandom identifier, (iv) encrypting the signed ballot and the pseudorandom identifier with the sponsoring entity public key to obtain an encrypted package and (v) communicating the encrypted package and an identity token of the user that attests to a verified identity of the user, from the user device to the relying party device. In some embodiments, the relying party device is associated with a registrar. In some embodiments, a ballot is generated by a sponsoring entity device associated with a sponsoring entity. In some embodiments, the sponsoring entity device is associated with a sponsoring entity public key and the sponsoring entity private key. In some embodiments, the ballot is digitally signed with the sponsoring entity private key to generate the signed ballot.

In some embodiments, the method further incudes the steps of (i) receiving the signed ballot from the sponsoring entity, at the relying party device, (ii) verifying the signed ballot with a list of eligible voters for an election that is stored in a relying party device database to determine a first eligible voter, (iii) communicating the signed ballot to the user device associated with the first eligible voter, (iv) receiving the encrypted package and the identity token of the user that attests to the verified identity of the user from the user device, (v) verifying that the ballot is signed by the user by verifying the identity token of the user that attests to a verified identity of the user and (vi) communicating an encrypted completed ballot to the sponsoring entity device. In some embodiments, the first eligible voter is the user, and the first eligible voter is associated with the user device.

In some embodiments, the method further incudes the steps of (i) communicating the signed ballot to the relying party device, (ii) receiving the encrypted completed ballot from the relying party device, (iii) decrypting the encrypted completed ballot using the sponsoring entity private key and (iv) publishing the ballot, the vote and the pseudorandom identifier associated with the vote in a public database.

In some embodiments, the relying party is governed by a blockchain smart contract by implementing a registrar code in the blockchain smart contract. In some embodiments, the blockchain smart contract includes (i) a voter table that is represented as an object and (ii) at least one method that obtains a ballot as an input from a sponsoring entity. In some embodiments, each row of the voter table includes at least one voter identifier. In some embodiments, the registrar code specifies (i) sending the ballot to each registered voter for the ballot, (ii) verifying that votes are received only from registered voters and (iii) forwarding the votes that are received to the sponsoring entity.

In another aspect, a system is provided. The system includes a cryptographic processor, a device processor and a non-transitory computer readable storage medium. The cryptographic processor generates a first set of credentials including a public-private key pair associated with a user. The public-private key pair includes a user public key and a user private key. The user private key is restricted to the cryptographic processor. The non-transitory computer readable storage medium storing one or more sequences of instructions, which when executed by the device processor, causes a method for enabling a relying party device associated with a relying party to verify an identity of a user by performing the steps of: (i) receiving at least one cryptographic challenge from the relying party device associated with the relying party, (ii) verifying at least one of a biometric or a PIN code by comparing the at least one of the biometric or the PIN code with at least one of a previously registered biometric associated with the user or a previously registered PIN code associated with the user that was previously registered for the user, and if the at least one of the biometric or the PIN code matches the at least one of the previously registered biometric associated with the user or the previously registered PIN code associated with the user, making the user private key available for executing at least one cryptographic operation, (iii) responding to the at least one cryptographic challenge by performing the at least one cryptographic operation on the at least one cryptographic challenge using the user private key to form a result of the at least one cryptographic operation and (iv) transmitting the result of the at least one cryptographic operation to the relying party device. The at least one cryptographic challenge includes or is derived from a pseudorandom value. The result is derived from or includes the pseudorandom value.

In some embodiments, receiving the at least one cryptographic challenge includes receiving an encrypted pseudorandom value that is derived from the pseudorandom value by encrypting the pseudorandom value with the user public key from the identity token, at the relying party device, and performing the at least one cryptographic operation on the at least one cryptographic challenge for responding to the at least one cryptographic challenge includes decrypting the encrypted pseudorandom value, and the result of the at least one cryptographic operation performed on the cryptographic challenge includes the pseudorandom value that is returned to the relying party device as the cryptographic challenge response.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 13 is a voter table that is stored in a blockchain smart contract of FIG. 12 according to some embodiments herein;

DETAILED DESCRIPTION OF PREFERRED EMBODIMENTS

Figure 1:
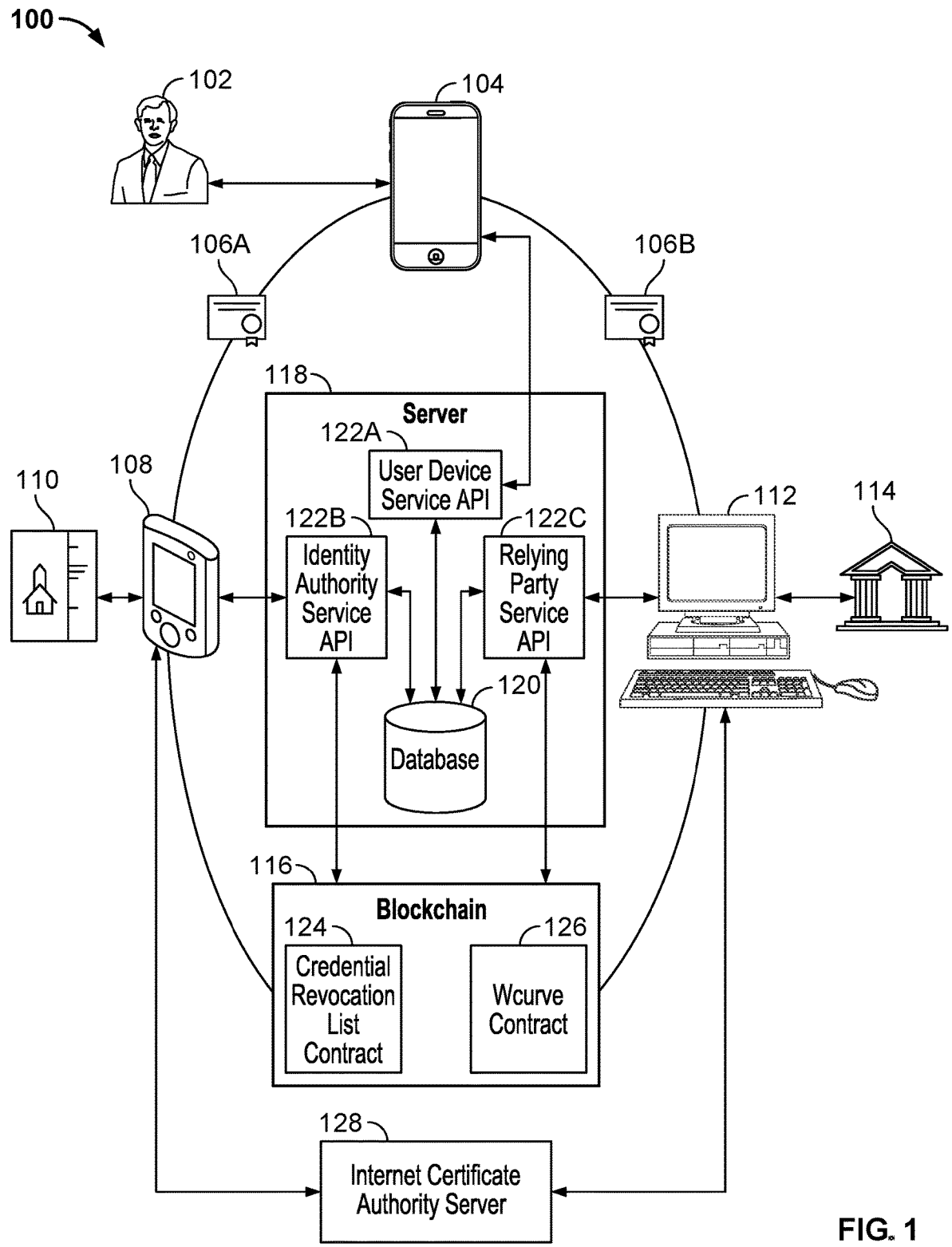
FIG. 1 is a block diagram that illustrates a system that enables a relying party device associated with a relying party to verify an identity of a user according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments.

There remains a need for a system and method for performing at least one cryptographic operation on a cryptographic challenge using a user private key and transmitting a result of the at least one cryptographic operation to a relying party device. Referring now to the drawings, and more particularly to FIGS. 1 through 18, where similar reference characters denote corresponding features consistently throughout the figures, there are shown preferred embodiments.

FIG. 1 is a block diagram that illustrates a system 100 that enables a relying party device 112 associated with a relying party 114 to verify an identity of a user 102 associated with a user device 104 according to some embodiments herein. The system 100 includes the user device 104, identity tokens 106A-B, an identity authority device 108 associated with an identity authority 110, the relying party device 112 associated with the relying party 114, a blockchain 116, a server 118 and an internet certificate authority server 128. The server 118 includes a database 120, a user device service application programming interface (API) 122A, an identity authority service API 122B, and a relying party service API 122C in some embodiments. The blockchain 116 includes a credential revocation list contract 124 and a wcurve contract 126.

The user device 104 includes a cryptographic processor that generates a first set of credentials that includes a public-private key pair associated with the user 102. The public-private key pair includes a user public key and a user private key. In some embodiments, a number of bits in the user public key and the user private key may be based on an algorithm used in the cryptographic processor of the user device 104. In some embodiments, the number of bits is 256. The user private key is restricted to the cryptographic processor on the user device 104. The user device 104, without limitation, may be selected from a mobile phone, a Personal Digital Assistant (PDA), a tablet, a desktop computer, or a laptop. The user device 104 receives at least one cryptographic challenge from the relying party device 112 associated with the relying party 114. In some embodiments, the at least one cryptographic challenge includes or is derived from a pseudorandom value. In some embodiments, the at least one cryptographic challenge is communicated to the user device 104 by uniquely identifying the user device 104 based on a 1-1 mapping from the user public key to the user device 104. The 1-1 mapping may be stored in the database 120 in the server 118.

In some embodiments, the user device 104 receives the at least one cryptographic challenge which includes an encrypted pseudorandom value that is derived from the pseudorandom value by encrypting the pseudorandom value with the user public key from an identity token 106B, at the relying party device 112. In some embodiments, the user device 104 performs the at least one cryptographic operation on the at least one cryptographic challenge for responding to the at least one cryptographic challenge may include decrypting the encrypted pseudorandom value.

In some embodiments, the user device 104 receives the at least one cryptographic challenge, which includes the pseudorandom value, from the relying party device 112. In some embodiments, the user device 104 performs the at least one cryptographic operation on the at least one cryptographic challenge for responding to the at least one cryptographic challenge. The cryptographic operation may include encrypting the pseudorandom value.

In some embodiments, the user device 104 receives the at least one cryptographic challenge which includes a pseudorandom value from the relying party device 112. In some embodiments, the user device 104 performs the at least one cryptographic operation on the at least one cryptographic challenge for responding to the at least one cryptographic challenge may include signing the pseudorandom value with the user private key.

The user device 104 verifies at least one of a biometric or a Personal Identification Number (PIN) code by comparing the at least one of the biometric or the PIN code with at least one of a previously registered biometric associated with the user 102 or a previously registered PIN code associated with the user 102, and if the at least one of the biometric or the PIN code matches the at least one of the previously registered biometric associated with the user 102 or the previously registered PIN code associated with the user 102, the user private key is made available for executing at least one cryptographic operation. In some embodiments, the biometric of the user 102 may include: (i) a fingerprint scan of the user 102; (ii) a facial feature scan of the user 102; (iii) an iris scan of the user 102; and/or a retina scan of the user 102.

The user device 104 responds to the at least one cryptographic challenge by performing the at least one cryptographic operation on the cryptographic challenge using the user private key to form a result of the at least one cryptographic operation.

The user device 104 transmits the result of the at least one cryptographic operation as a cryptographic challenge response to the relying party device 112. The result may be derived from the pseudorandom value or it may include the pseudorandom value. In some embodiments, the result of the at least one cryptographic operation performed on the cryptographic challenge includes the pseudorandom value that is returned to the relying party device 112 as the cryptographic challenge response. In some embodiments, the result of the of the at least one cryptographic operation performed on the at least one cryptographic challenge includes the encrypted pseudorandom value. The relying party device 112 may decrypt the encrypted pseudorandom value from the cryptographic challenge response to obtain the pseudorandom value. In some embodiments, the result of the of the at least one cryptographic operation performed on the at least one cryptographic challenge includes a signed pseudorandom value. The relying party device 112 may verify a signature of the pseudorandom value from the cryptographic challenge response.

The user device 104 may obtain an identity token 106A from the identity authority 110. In some embodiments, the identity token 106A includes a credential public key, an identity token ID, an expiration date, and one or more attributes. In some embodiments, the credential public key is the public key of the first set of credentials to which the identity token is issued. In some embodiments, the identity token ID is a unique identifier within a domain of the identity authority 110. In some embodiments, the expiration date is a date until which the identity Token 106A is valid. For example, an identity document, e.g. a driver's license may be valid for a limited period of time, after which the identity token 106A corresponding to the identity token may expire. A new identity token may then be generated when the identity document is renewed, or when a new identity document is obtained. In some embodiments, the attributes are actual identity attributes being certified (e.g. a name, a date of birth, an address etc.).

The database 120 stores a mapping between the user public key and a device token of a device that is associated with the user 102. The mapping may be a 1-1 mapping. The mapping may be updated dynamically when the device is stolen, broken, lost etc. In some embodiments, the device token is a unique key of the device that is associated with the user 102. In some embodiments, each device of the user 102 includes a unique device token. The server 118 may include a key vault and a blob storage. In some embodiments, the key vault stores signing keys of the identity authority 110. In some embodiments, the signing keys are (i) an identity authority public key and (ii) an identity authority private key. In some embodiments, the blob storage stores signed certificates temporarily until the signed certificates are communicated to the user device 104. In some embodiments, the generated sign certificates are deleted or removed from the blob storage once an issuer signs the certificates. The user device service API 122A may communicate the signed certificates to the user device 104 of the user 102. The user device service API 122A may enable the user device 104 to communicate with the blockchain 116. The identity authority service API 122B may enable the identity authority device 108 to communicate with the blockchain 116. The relying party service API 122C may enable the relying party device 112 to communicate with the blockchain 116.

The identity authority 110 may possess an identity authority signature key pair that includes the identity authority public key and the identity authority private key. In some embodiments, the identity token 106A includes the user public key, a unique identifier of the identity token 106A, and at least one identity attribute. In some embodiments, the at least one identity attribute is selected from a photograph of the user 102, a video of the user 102, an information identifier in the identity document, an information identifier in a verified legal identity, and an information identifier in a government issued identity. In some embodiments, the identity document is selected from a student identity proof, an employment proof, or an insurance card. The government issued identity may be selected from a voter identity document or a passport. The government issued identity may include a national identification number, and it may be associated with one or more biometrics of the user 102. The identity attribute may include a credit score, a mark sheet or report card of a student, an employee performance rating etc.

The identity authority device 108 may securely sign the identity token 106A with the identity authority private key. The identity authority device 108 may encrypt the identity token 106A with the user public key. The identity authority device 108 may register the identity authority public key with the internet certificate authority server 128. In some embodiments, the identity token 106A securely attests to at least one of the verified legal identity, the government issued identity, or the at least one identity attribute. The identity authority device 108, without limitation, may be selected from a mobile phone, a Personal Digital Assistant (PDA), a tablet, a desktop computer, a server, or a laptop.

The user device 104 may decrypt an encrypted identity token, with the user private key, to obtain the identity token 106A. The user device 104 may provide at least one of the verified legal identity, the government issued identity, or the at least one identity attribute that the identity token 106B securely attests to the relying party device 112.

The relying party device 112 may obtain the identity token 106B from the user device 104 associated with the user 102 and verify with the internet certificate authority server 128 if the identity token 106B was issued by the identity authority 110. In some embodiments, the identity authority 110 retains a copy of the identity token 106A, and the at least one identity attribute of the identity token is unpublished on the blockchain 116. The relying party 114 may be a bank, a credit card company or a merchant. The relying party device 112, without limitation, may be selected from a mobile phone, a Personal Digital Assistant (PDA), a tablet, a desktop computer, a server, or a laptop.

In some embodiments, the credential revocation list contract 124 is registered on the blockchain 116. In some embodiments, the blockchain 116 verifies a signature directly using the wcurve contract 126. In some embodiments, the wcurve contract 126 enables (i) the user 102, the identity authority 110 or (iii) the relying party 114 to verify their signature directly with the wcurve contract 126. In some embodiments, the wcurve contract 126 enables the user 102 to sign blockchain transactions directly with the user's digital identity management credentials and provide proof of identity using associated identity tokens. In some embodiments, the credential revocation list contract 124 enables the first set of credentials generated on the user device 104 to be revoked by a second set of credentials generated on a second user device. In some embodiments, the credential revocation list contract 124 includes a revokee table that stores at least one public key from a revokee device and at least one public key of a corresponding authorized revoker device. In some embodiments, if a registered authorized revoker device calls the credential revocation list contract 124 to revoke credentials of the revokee device, a revocation transaction is digitally signed and recorded on the blockchain 116, and a revocation message is sent to a public key address of the revokee device. In some embodiments, the user device 104 registers the user public key on a public blockchain, or registering the user public key on a permissioned blockchain.

An example pseudo code for a CRL Blockchain Contract is:

Contract Credential_Revocation_List (input Data Mesg)
{
If Mesg::type=="Register" then
{
Add_to_Revokee_Table    (PubKeyCaller,    Mesg::PubKey_Revoker)
}
Else if Mesg::type="Revoke" then
{
If   PubKey   Caller==Lookup_Revokee_Table(Mesg::Pubkey_Revokee) then Send_Revoke_Mesg (Mesg::Pubkey_Revokee,   "Credentials   Revoked   by PubKey_Caller")
}
}

In some embodiments, an identity token revocation list contract is registered with the blockchain 116. The identity authority 110 may send a message to a user public key address to which the identity token 106A was issued, to revoke the identity token 106. In some embodiments, the message sent by the identity authority 110 includes a token ID of the identity token 106A.

Figure 2:
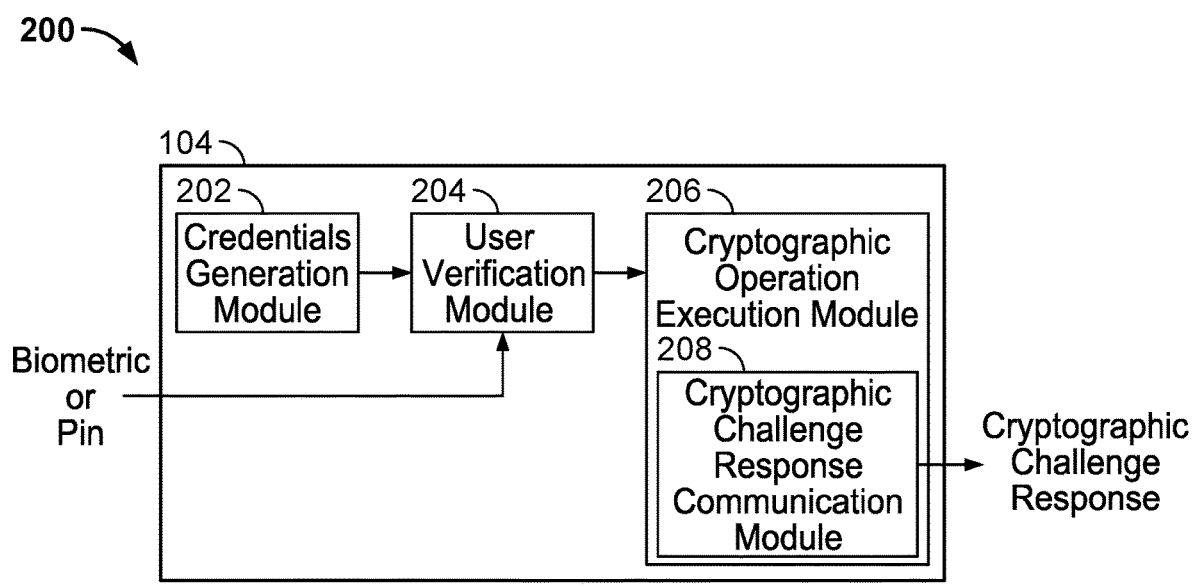
FIG. 2 is a block diagram of a user device of FIG. 1 according to some embodiments herein.

FIG. 2 is a block diagram 200 of the user device 104 of FIG. 1 according to some embodiments herein. The user device 104 includes a credentials generation module 202, a user verification module 204 and a cryptographic operation execution module 206. The cryptographic operation execution module 206 includes a cryptographic challenge response communication module 208. The credentials generation module 202 generates a first set of credentials including a public-private key pair associated with the user 102 using a cryptographic processor in the user device 104. The public-private key pair includes a user public key and a user private key. The user private key is restricted to the cryptographic processor on the user device 104. The cryptographic challenge response communication module 208 receives at least one cryptographic challenge from the relying party device 112 associated with the relying party 114. In some embodiments, the at least one cryptographic challenge includes or is derived from a pseudorandom value. The user verification module 204 verifies at least one of a biometric or a PIN code by comparing the at least one of the biometric or the PIN code with at least one of a previously registered biometric associated with the user 102 or a previously registered PIN code associated with the user 102. If the at least one of the biometric or the PIN code matches the at least one of the previously registered biometric associated with the user 102 or the previously registered PIN code associated with the user 102, the user private key is made available for executing at least one cryptographic operation. The cryptographic operation execution module 206 responds to the at least one cryptographic challenge by performing the at least one cryptographic operation on the cryptographic challenge using the user private key to form a result of the at least one cryptographic operation. The cryptographic challenge response communication module 208 further transmits the result of the at least one cryptographic operation as a cryptographic challenge response to the relying party device 112. The result may be derived from or may include the pseudorandom value.

Figure 3:
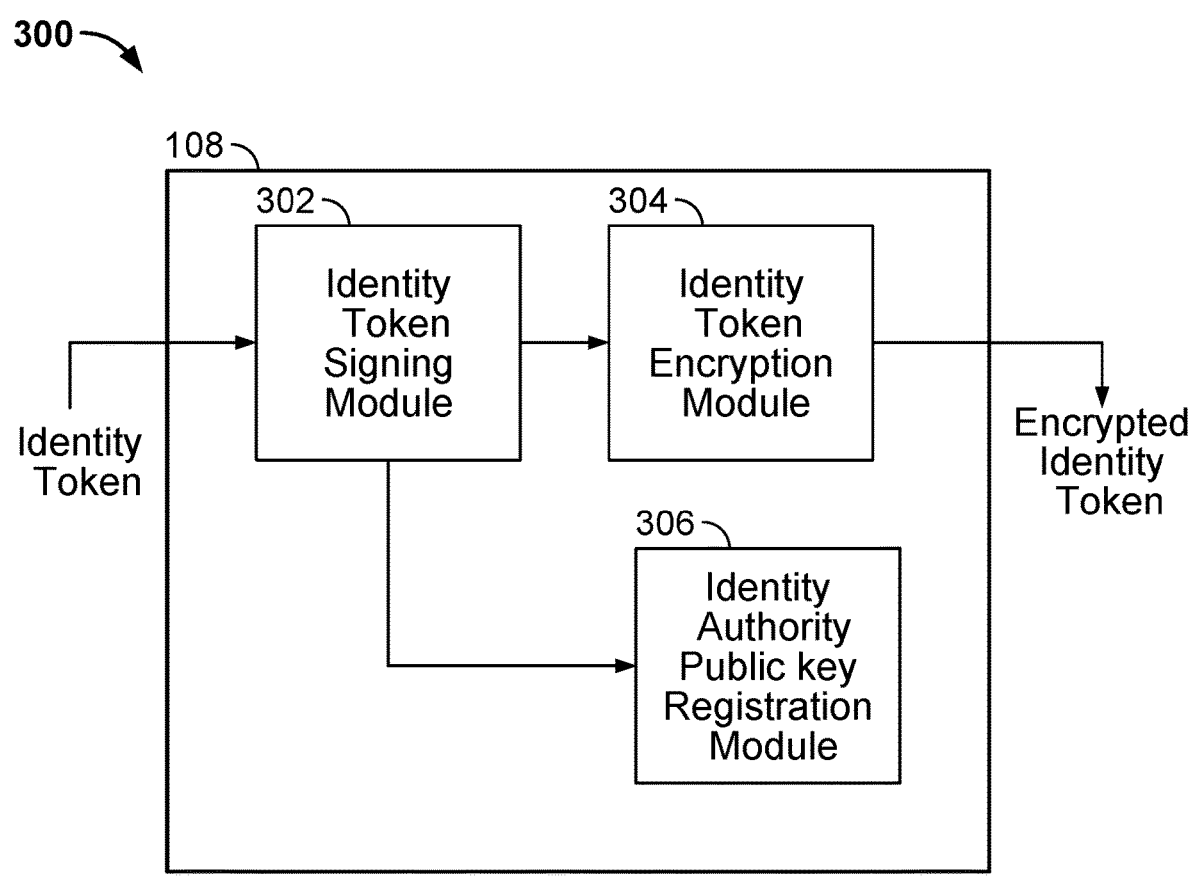
FIG. 3 is a block diagram of an identity authority device of FIG. 1 according to some embodiments herein.

FIG. 3 is a block diagram 300 of the identity authority device 108 of FIG. 1 according to some embodiments herein. The identity authority device 108 includes an identity token signing module 302, an identity token encryption module 304 and an identity authority public key registration module 306. The identity token signing module 302 obtains the identity token 106A from the identity authority 110. In some embodiments, the identity authority 110 possesses an identity authority signature key pair that includes an identity authority public key and an identity authority private key. In some embodiments, the identity token 106A includes a user public key, a unique identifier of the identity token 106A, and at least one identity attribute. The identity token signing module 302 securely signs the identity token 106A with the identity authority private key. The identity token encryption module 304 encrypts the identity token 106A with the user public key, to obtain an encrypted identity token. The identity authority public key registration module 306 registers the identity authority public key with the internet certificate authority server 128. In some embodiments, the identity token 106A securely attests to at least one of an identity document, a verified legal identity, a government issued identity, or the at least one identity attribute.

Figure 4:
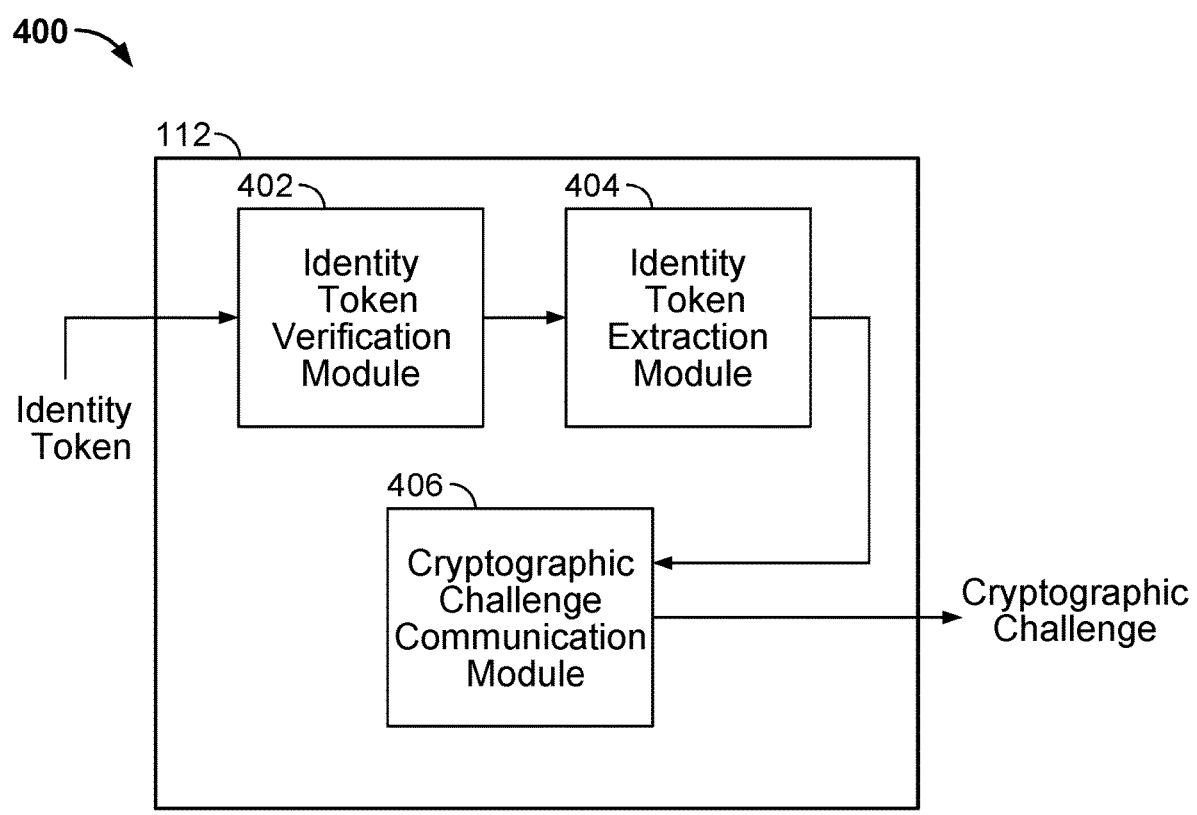
FIG. 4 is a block diagram of the relying party device of FIG. 1 according to some embodiments herein.

FIG. 4 is a block diagram 400 of the relying party device 112 of FIG. 1 according to some embodiments herein. The relying party device 112 includes an identity token verification module 402, an identity token extraction module 404 and a cryptographic challenge communication module 406. The identity token verification module 402 verifies with the internet certificate authority server 128, if the identity token 106B was issued by the identity authority 110. The identity token extraction module 404 extracts the identity token 106A from an electronic document. The cryptographic challenge communication module 406 sends at least one cryptographic challenge to the user device 104 associated with a user public key that is associated with the identity token 106B to verify that the user public key associated with the identity token 106B corresponds to a user private key used to sign the electronic document. The cryptographic challenge communication module 406 receives a transaction request on behalf of the user 102 associated with a record on an alert database. The cryptographic challenge communication module 406 further sends a cryptographic challenge response to the user device 104 associated with a first set of credentials and authorizes the transaction request only if the transaction request was signed using the first set of credentials.

Figure 5:
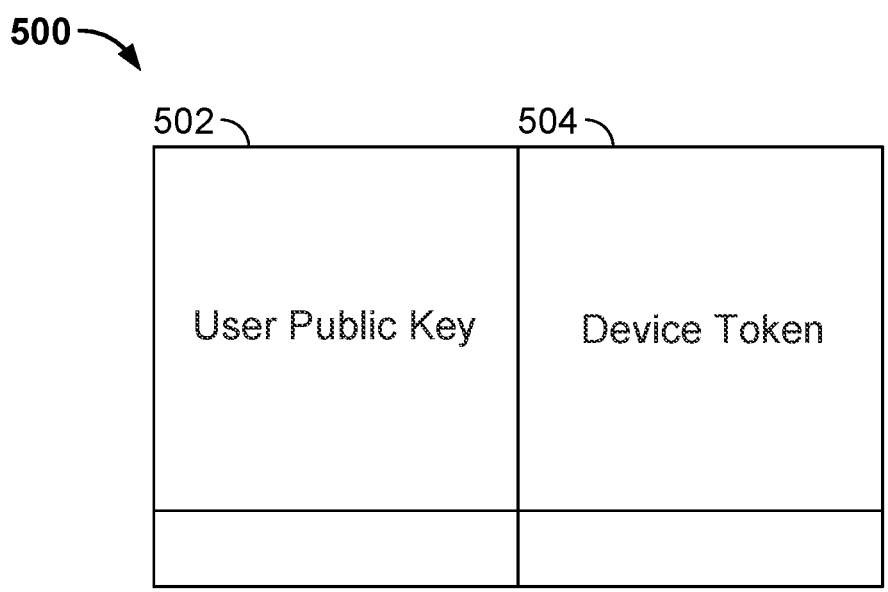
FIG. 5 is a table view of a mapping that is stored in a database of a server of FIG. 1 according to some embodiments herein.

FIG. 5 illustrates a table 500 that is stored in the database 120 of the server 118 of FIG. 1 according to some embodiments herein. The table 500 includes a mapping between (i) a user public key 502 and (ii) a device token 504. In some embodiments, at least one cryptographic challenge is communicated to the user device 104 by uniquely identifying the user device 104 based on a 1-1 mapping from the user public key 502 to the device token 504. The device token 504 identifies the user device 104. The mapping may be updated dynamically as and when a device is damaged, lost or stolen.

Figure 6:
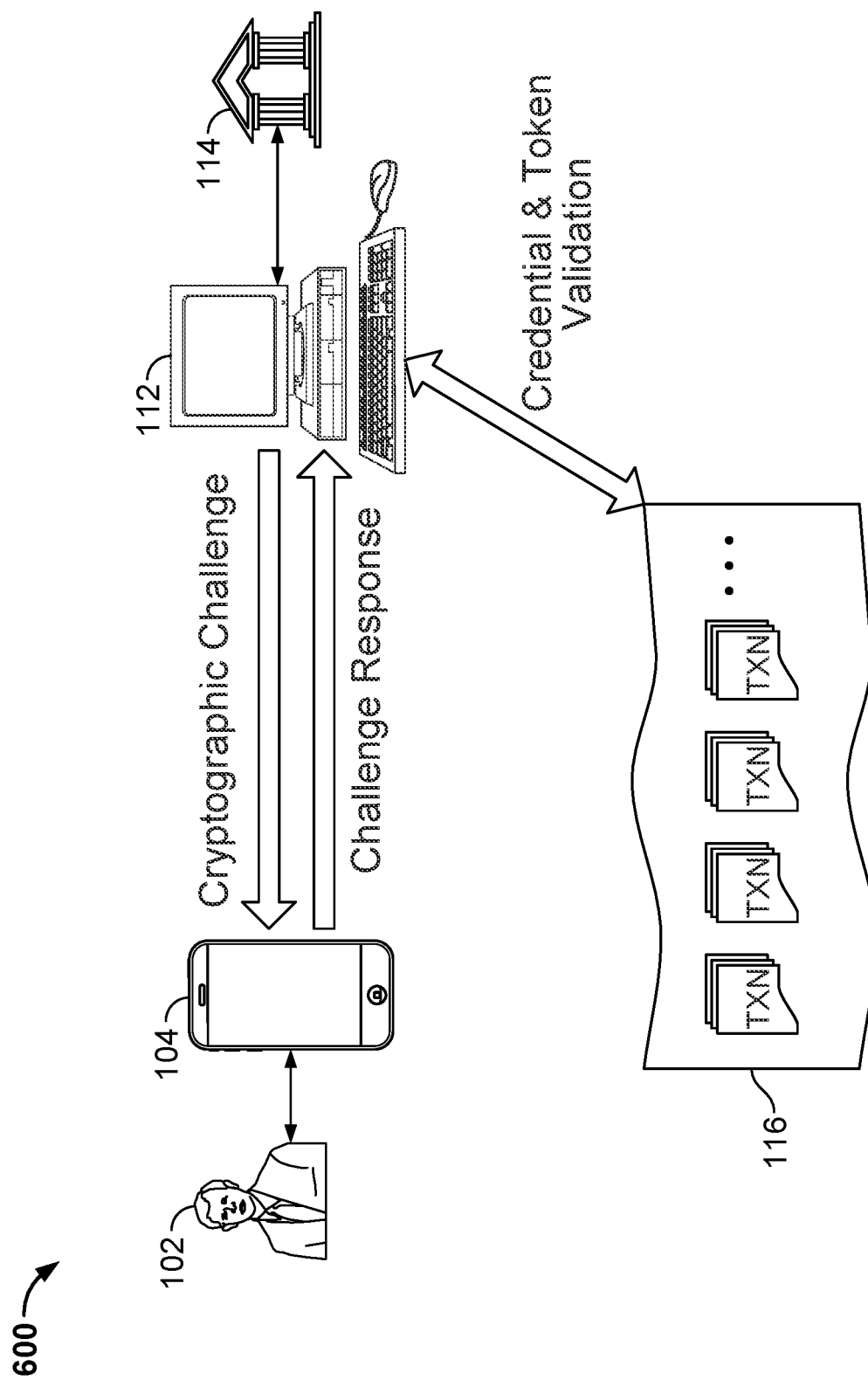
FIG. 6 is a block diagram of the user device performing at least one cryptographic operation according to some embodiments herein.

FIG. 6 is a block diagram 600 that illustrates performing at least one cryptographic operation in the user device 104 according to some embodiments herein. The block diagram 600 includes the user 102, the user device 104, the relying party device 112, the relying party 114 and the blockchain 116. The user device 104 receives a cryptographic challenge from the relying party device 112 associated with the relying party 114. In some embodiments, the cryptographic challenge includes or is derived from a pseudorandom value, and a result of the cryptographic operation is derived from or includes the pseudorandom value.

In some embodiments, the user device 104 receives at least one cryptographic challenge which includes an encrypted pseudorandom value that is derived from the pseudorandom value by encrypting the pseudorandom value with a user public key from the identity token 106B, at the relying party device 112. In some embodiments, the user device 104 performs the at least one cryptographic operation on the at least one cryptographic challenge for responding to the at least one cryptographic challenge. The cryptographic operation may include decrypting the encrypted pseudorandom value, at the user device 104.

In some embodiments, the user device 104 receives the at least one cryptographic challenge which includes the pseudorandom value from the relying party device 112. In some embodiments, the user device 104 performs the at least one cryptographic operation on the at least one cryptographic challenge for responding to the at least one cryptographic challenge. The cryptographic operation may include encrypting the pseudorandom value. The user device 104 transmits the result of the at least one cryptographic operation as a cryptographic challenge response to the relying party device 112. The relying party device 112 receives the result to the cryptographic challenge from the user device 104 to conditionally authenticate the user 102 based on the cryptographic challenge response. In some embodiments, a first set of credentials generated on the user device 104 and identity tokens are validated using the blockchain 116. For example, the blockchain 116 can be used to determine a state e.g. active/inactive/revoked of the first set of credentials and/or the identity tokens.

The result may be derived from or may include the pseudorandom value. In some embodiments, the result of the at least one cryptographic operation performed on the cryptographic challenge includes the pseudorandom value that is returned to the relying party device 112 as the cryptographic challenge response. In some embodiments, the result of the of the at least one cryptographic operation performed on the at least one cryptographic challenge includes an encrypted pseudorandom value. The relying party device 112 may decrypt the encrypted pseudorandom value from the cryptographic challenge response to obtain the pseudorandom value.

Figure 7:
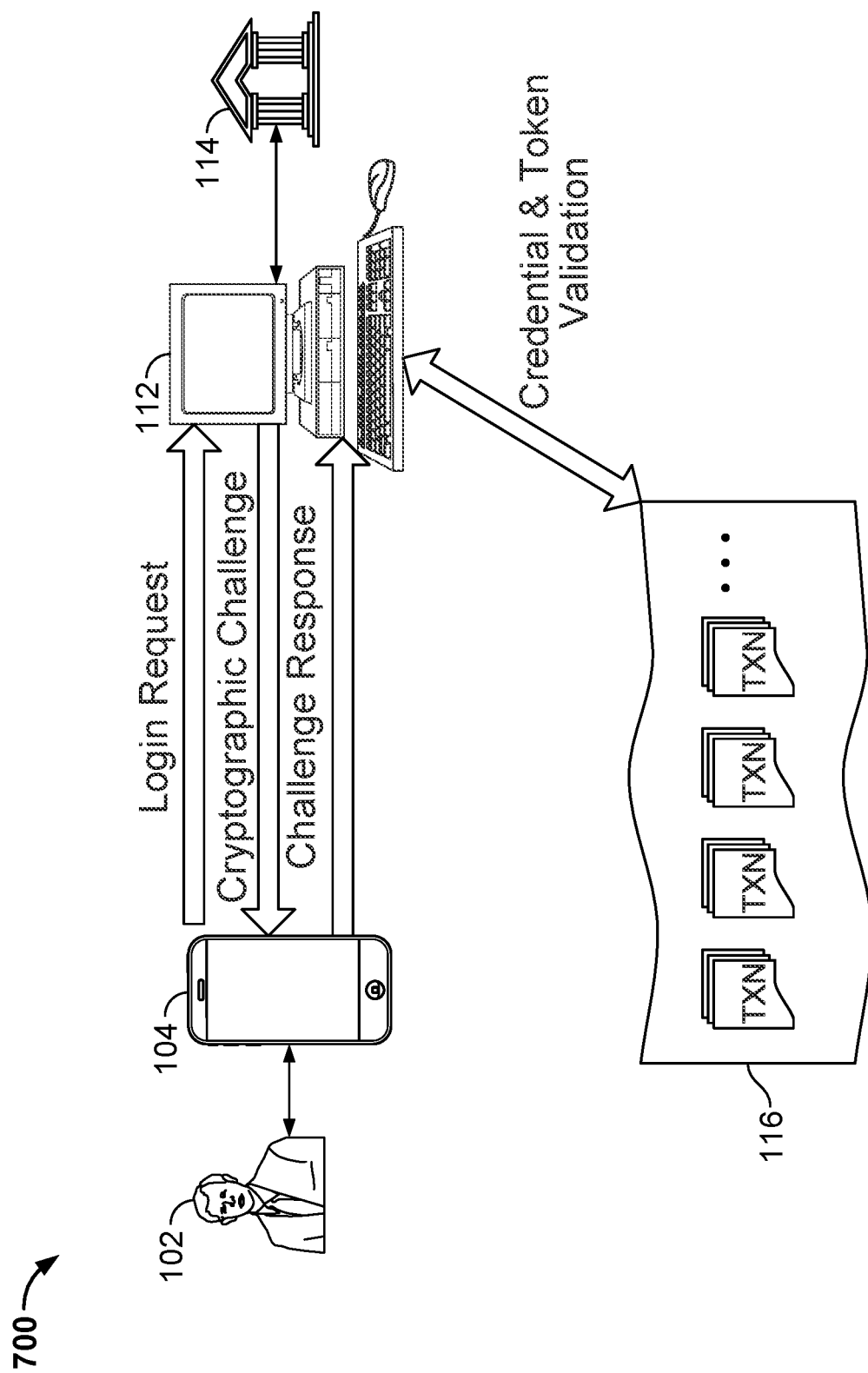
FIG. 7 is a block diagram that illustrates the relying party device authenticating the user based on a response to a cryptographic challenge from the user device according to some embodiments herein.

FIG. 7 is a block diagram 700 that illustrates a process for authenticating the user 102 using the relying party device 112 based on the response to a cryptographic challenge from the user device 104 according to some embodiments herein. The block diagram 700 includes the user 102, the user device 104, the relying party device 112, the relying party 114 and the blockchain 116. The relying party device 112 receives an authentication request that includes a user public key from the user device 104. The relying party device 112 sends the cryptographic challenge to the user device 104 that is associated with the user public key. In some embodiments, the cryptographic challenge includes or is derived from a pseudorandom value. The user device 104 responds to the cryptographic challenge by performing a cryptographic operation on the cryptographic challenge using the user private key to form a result of the cryptographic operation. In some embodiments, the first set of credentials generated on the user device 104 and the identity tokens are validated using the blockchain 116. For example, the blockchain 116 can be used to determine a state e.g. active/inactive/revoked of the first set of credentials and/or the identity tokens.

Figure 8:
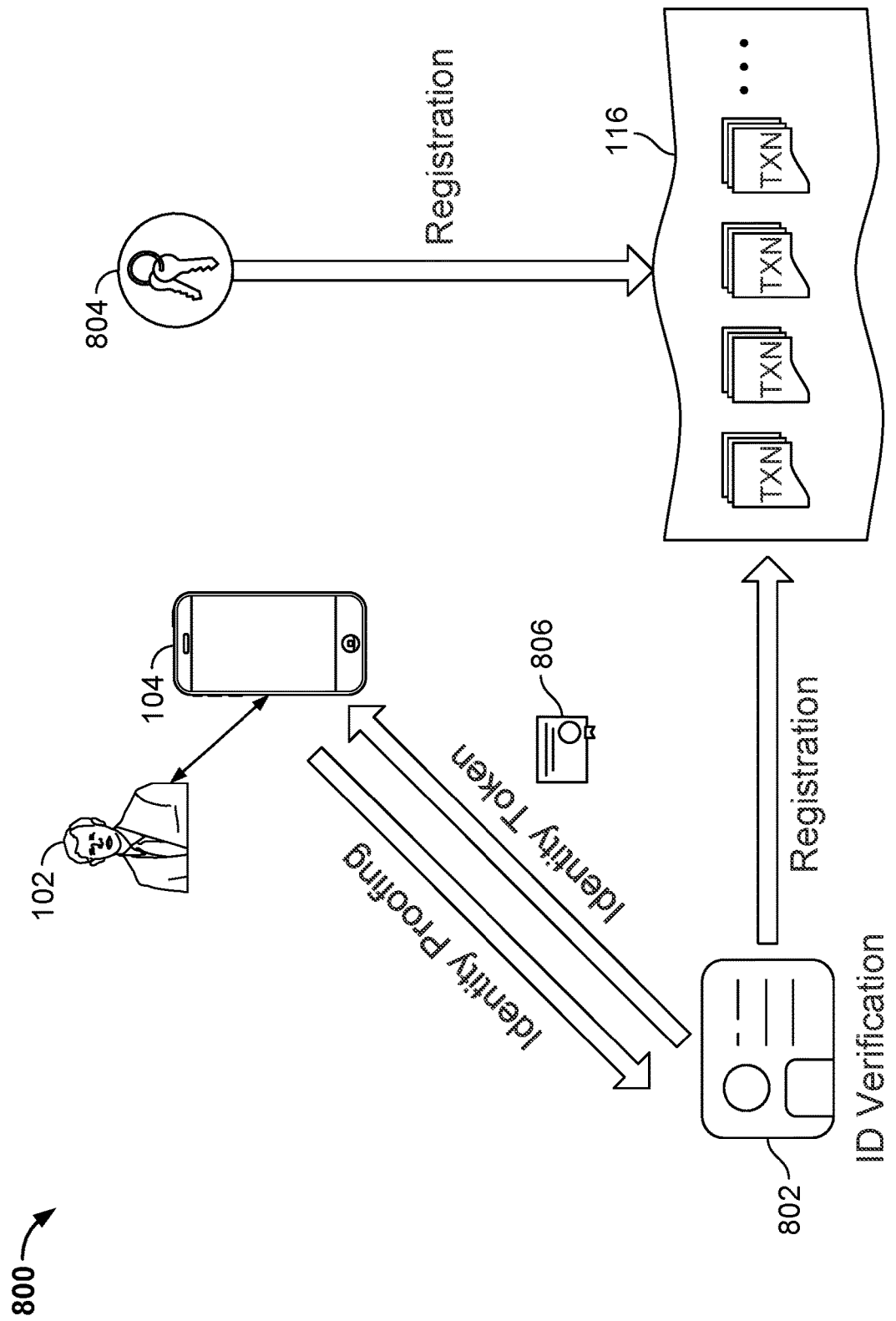
FIG. 8 is a block diagram that illustrates the relying party device verifying an identity proof of the user using an identity token obtained from the user device according to some embodiments herein.

FIG. 8 is a block diagram 800 that illustrates the relying party device 112 verifying an identity proof of the user 102 using identity tokens 806 obtained from the user device 104 according to some embodiments herein. The block diagram 800 includes the user 102, the user device 104, the blockchain 116, ID verification 802, third-party credentials 804 and the identity tokens 806. In some embodiments, the user 102 verifies their legal ID and then re-uses it across any number of relying parties when a cryptographic equivalent representation is created. In some embodiments, the user device 104 uses online ID verification services to serve as "notarizing authority" who take on a task of "proofing" a user's legal identity. The notarizing authority may verify a user's government issued ID, e.g. physically or electronically and then issue the set of identity tokens 806 to the third-party credentials 804, e.g. those created on their mobile phone. The user 102 uses the identity tokens 806 with any service that requires them to produce a validated identity. In some embodiments, a state of the third-party credentials 804 and the set of identity tokens 806 can be first recorded or registered, and then validated using the blockchain 116. For example, the blockchain 116 can be used to determine a state e.g. active/inactive/revoked of the first set of credentials and/or the identity tokens.

Figure 9:
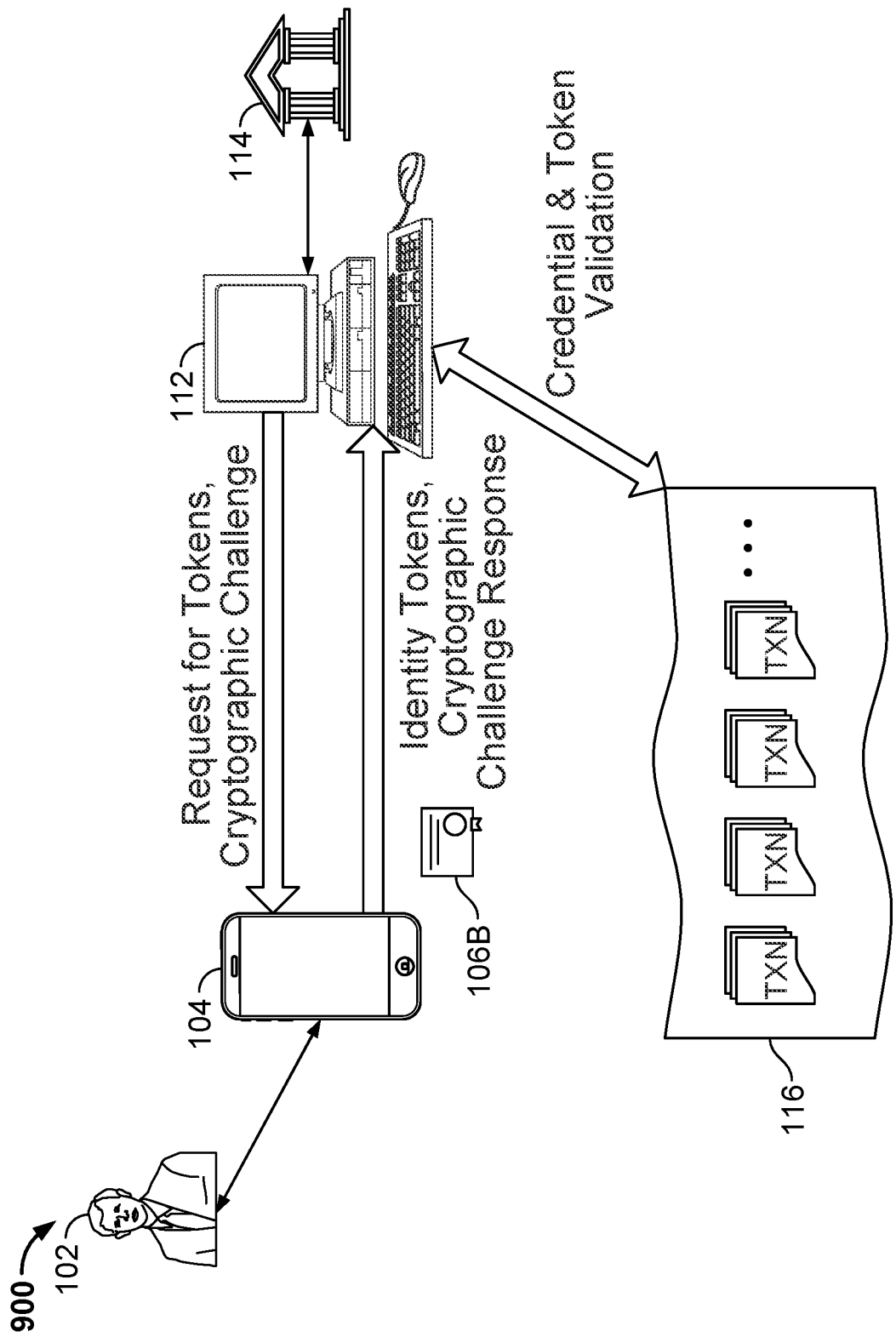
FIG. 9 is a block diagram that illustrates the relying party device verifying credentials and the identity token according to some embodiments herein.

FIG. 9 is a block diagram 900 that illustrates the relying party device 112 verifying credentials and the identity tokens 106B according to some embodiments herein. The block diagram 900 includes the user 102, the user device 104, the relying party device 112, the relying party 114, the blockchain 116 and the identity tokens 806. The relying party 114 may send a request for the identity tokens 806 to the user device 104 using the relying party device 112. The relying party 114 may send a cryptographic challenge to the user device 104 using the relying party device 112. The user device 104 receives the cryptographic challenge from the relying party device 112 associated with the relying party 114. The user device 104 verifies at least one of a biometric or a PIN code by comparing the at least one of the biometric or the PIN code with at least one of a previously registered biometric or a previously registered PIN code that was previously registered for the third party, and if the at least one of the biometric or the PIN code matches the at least one of the previously registered biometric or the previously registered PIN code, making a third party private key available for executing cryptographic operations. The user device 104 responds to the cryptographic challenge by performing at least one cryptographic operation on the cryptographic challenge using a third-party private key and transmitting a result of the cryptographic operation to the relying party device 112. The user device 104 sends the identity token 106B to the relying party device 112. In some embodiments, a state of the credentials generated on the user device 104 and identity token 106B are first recorded and then validated using the blockchain 116. For example, the blockchain 116 can be used to determine a state e.g. active/inactive/revoked of the first set of credentials and/or the identity tokens.

Figure 10:
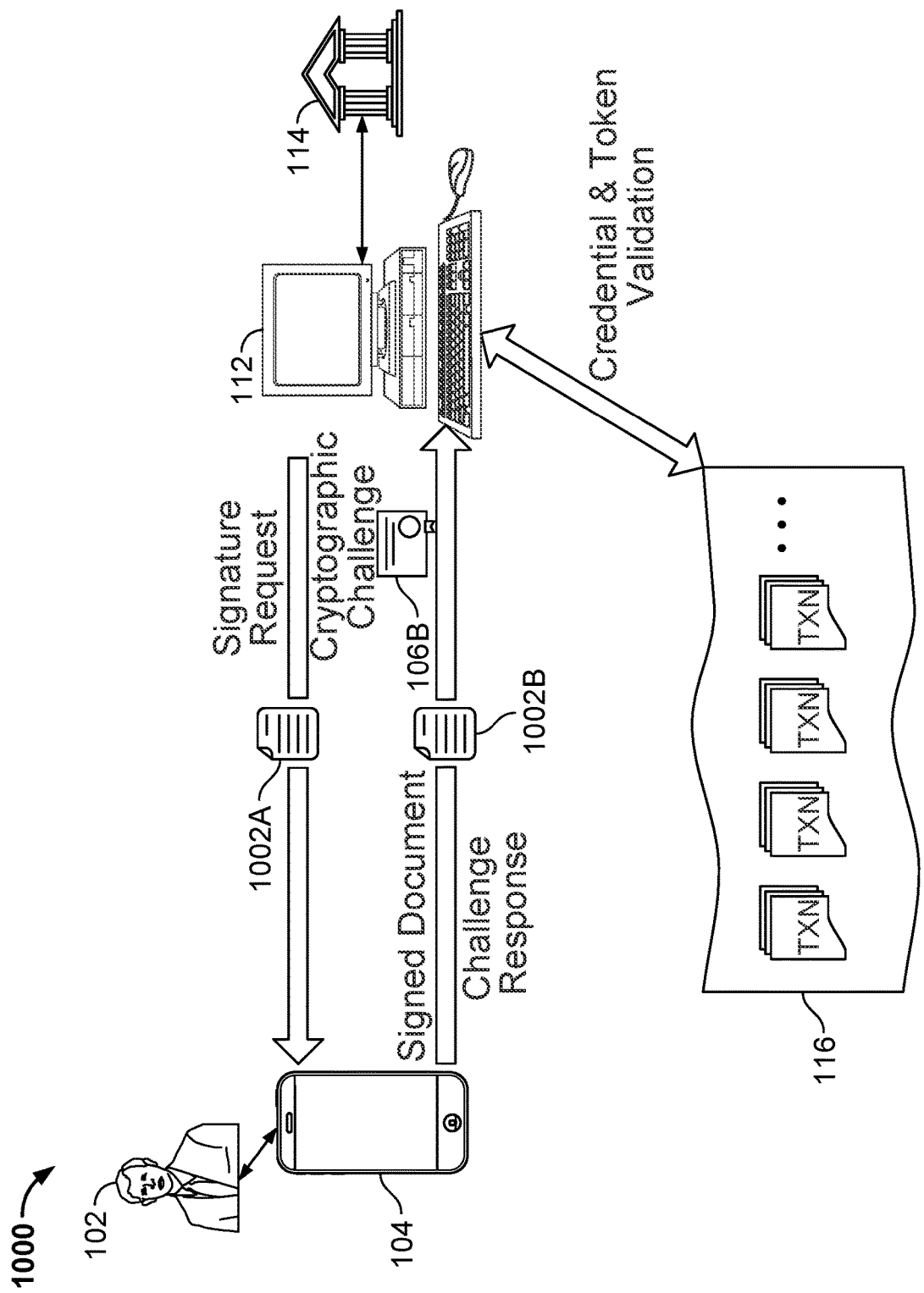
FIG. 10 is a block diagram that illustrates a process for signing an electronic document using the user device according to some embodiments herein.

FIG. 10 is a block diagram 1000 that illustrates a process for signing an electronic document 1002A using the user device 104 according to some embodiments herein. The block diagram 1000 includes the user 102, the user device 104, the relying party device 112, the relying party 114 and the blockchain 116. The relying party 114 sends a request to the user device 104 for signing the electronic document 1002A. The electronic document 1002A, without limitation, may be a word document (.doc or .docx), a Portable File Document (PDF), a Spreadsheet (.xls or .xlsx) or a PowerPoint (.ppt or .pptx). The user device 104 receives the electronic document 1002A from the relying party device 112 and embeds the identity token 106B into the electronic document 1002A and cryptographically signs the electronic document 1002A with a user private key. The relying party device 112 receives the signed document 1002B from the user device 104 and extracts the identity token 106B from the signed document 1002B. The relying party device 112 sends the cryptographic challenge, to the user device 104 associated with the user public key associated with the identity token 106B to verify that the user public key associated with the identity token 106B corresponds to a user private key used to sign the electronic document 1002A. In some embodiments, credentials generated on the user device 104 and the identity token 106B can be validated using the blockchain 116. For example, the blockchain 116 can be used to determine a state e.g. active/inactive/revoked of the first set of credentials and/or the identity tokens.

Figure 11:
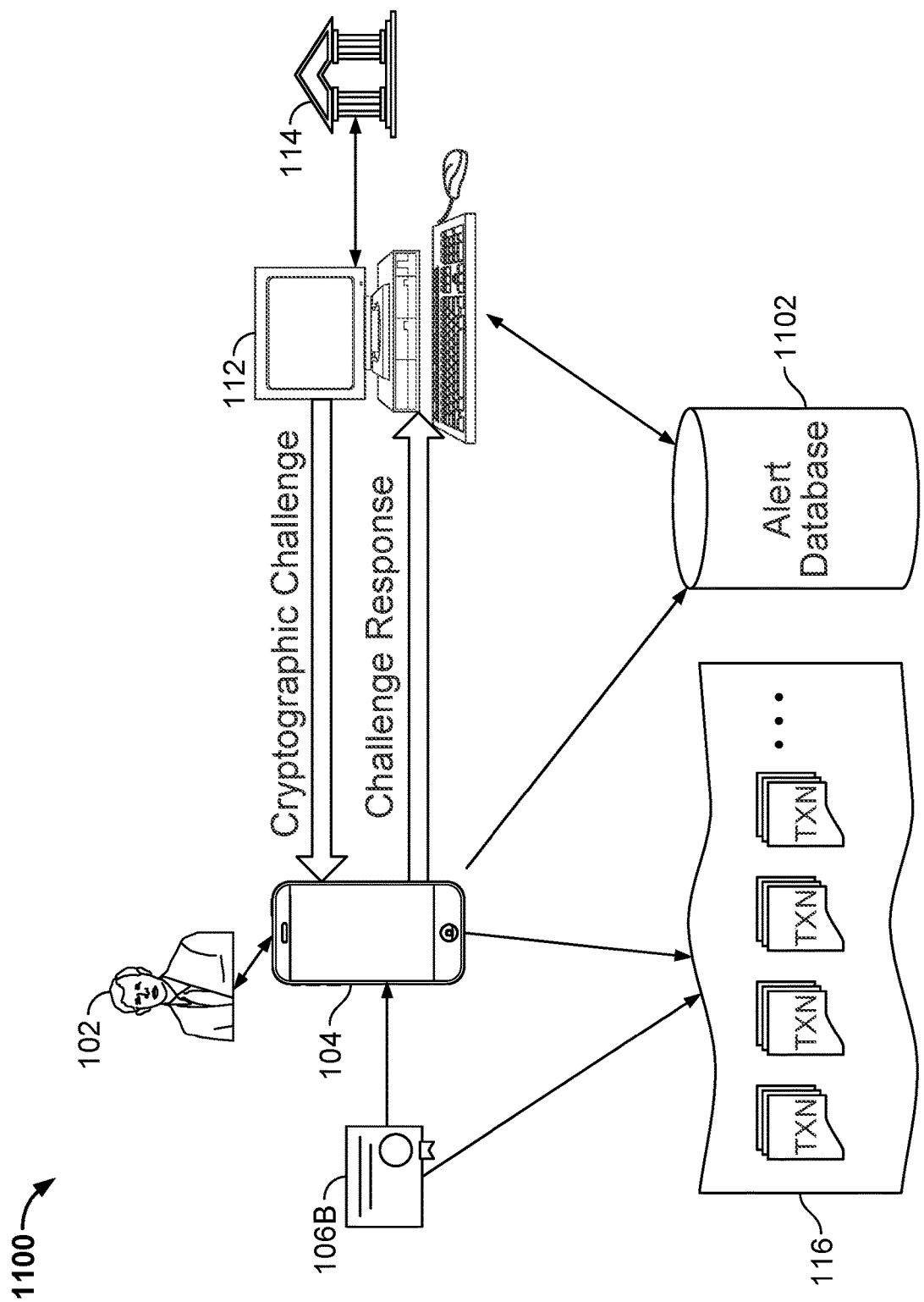
FIG. 11 is a block diagram that illustrates a process for protecting the user against identity theft fraud according to some embodiments herein.

FIG. 11 is a block diagram 1100 that illustrates a process for protecting a user identity against identity theft fraud according to some embodiments herein. The block diagram 1100 includes the user 102, the user device 104, the relying party device 112, the relying party 114, the blockchain 116 and an alert database 1102. The user device 104 signs a record using a user private key and storing a signed record on a public list or the alert database 1102. The alert database 1102 includes a fraud alert list. In some embodiments, the fraud alert list prevents the user 102 from identity-theft fraudsters who transact, e.g. obtain loans, credit cards, debit cards or file tax returns on the user's behalf. The relying party device 112 receives a transaction request or a new application on behalf of the user 102 associated with the record on the alert database 1102. The relying party 114, e.g. a bank or credit card company may check the fraud alert list that is stored in the alert database 1102 to verify that the new application is digitally signed with the first set of credentials of the user 102 when the relying party 114 receives (i) the new application for a credit card, a debit card or (ii) the transaction request from a second user. The relying party device 112 sends the cryptographic response to the user device 104 associated with the first set of credentials. The relying party device 112 authorizes the transaction request or processes the new application only if the transaction request or the new application was signed using the first set of credentials. In some embodiments, the first set of credentials generated on the user device 104 and the identity token 106B can be validated using the blockchain 116. For example, the blockchain 116 can be used to determine a state e.g. active/inactive/revoked of the first set of credentials and/or the identity tokens.

Figure 12:
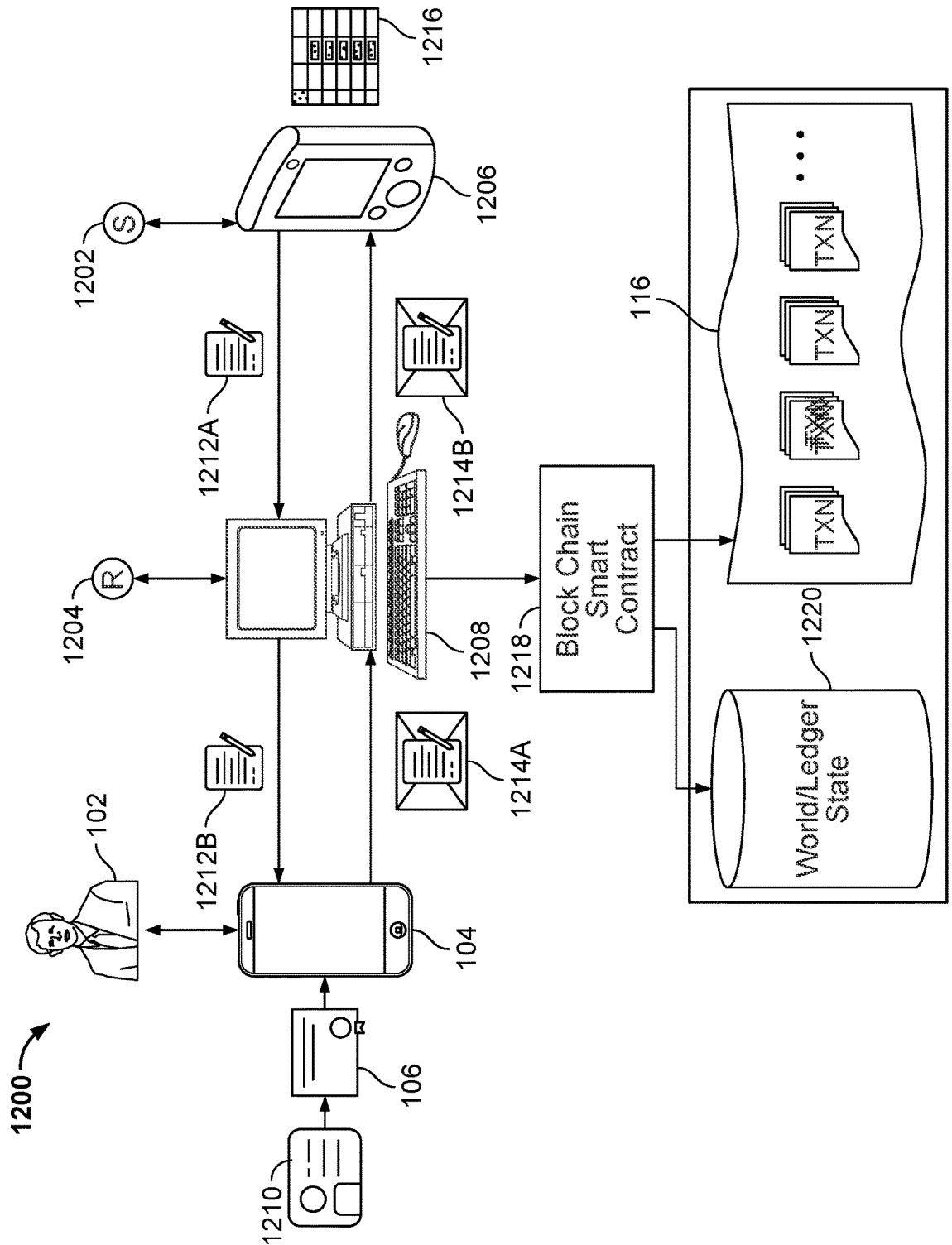
FIG. 12 is a block diagram that illustrates a process for verifying an identity of the user and an eligibility of the user to vote by the relying party based on a ballot generated by a sponsoring entity according to some embodiments herein.

FIG. 12 is a block diagram 1200 that illustrates a process for verifying an identity of the user 102 and eligibility of the user 102 to vote according to some embodiments herein. The block diagram includes the user 102, the user device 104, the identity token 106, the blockchain 116, a sponsoring entity 1202, a registrar 1204, a sponsoring entity device 1206, a relying party device 1208 and an ID verification 1210. In some embodiments, the user 102 is a first eligible voter. In some embodiments, the user device 104 is a voter device. In some embodiments, the registrar 1204 is a relying party. In some embodiments, the registrar device 1208 is a relying party device. In some embodiments, the registrar 1204 is an entity entrusted to conduct an election. The registrar 1204 has information about registered voters and number of votes of each voter, e.g. in the case of a shareholder's vote, the voter is typically eligible to as many votes as the number of shares they own. The sponsoring entity 1202 without limitation, may be an election commission, a Homeowner association (HOA) or a Corporation (for a shareholder's vote). In some embodiments, each voter has a set of credentials, as described herein, and an associated Identity Token 106 that establishes their eligibility to vote.

The sponsoring entity device 1206 generates a ballot 1212A and digitally signs the ballot 1212A with a sponsoring entity private key at the sponsoring entity device 1206. In some embodiments, the sponsoring entity device 1206 is associated with a sponsoring entity public key and the sponsoring entity private key. The sponsoring entity 1202 communicates the signed ballot 1212A to the registrar device 1208, e.g. a relying party device communicating with the sponsoring entity device 1206.

The registrar device 1208, e.g. the relying party device 112 associated with the registrar 1204, e.g., the relying party 114, receives the signed ballot 1212A from the sponsoring entity device 1206. The registrar 1204 may verify the signed ballot 1212A with a database that includes a list of eligible voters for an election. The registrar device 1208 may identify the first eligible voter and communicate a signed ballot 1212B to the user device 104, which is associated with the first eligible voter. In some embodiments, the registrar device 1208 communicates the signed ballot 1212B to only one user device associated with each eligible voter listed in a registrar device database, and the registrar device 1208 communicates the signed ballot 1212B only to eligible voters. In some embodiments, each voter may have more than one user device, but the signed ballot 1212B is communicated to only one user device associated with the voter that is listed in the registrar device database, so that the voter can vote only once using only one user device. In some embodiments when the only user device associated with the voter is lost, user credentials can be recovered from a second user device. In some embodiments, the signed ballot 1212B includes the corresponding indication of a number of votes of each voter, e.g. in case of a shareholder's vote, a voter is typically eligible to as many votes as the number of shares they own.

The user device 104 (i) obtains the signed ballot 1212B from the registrar device 1208, e.g. the relying party device 112, (ii) populates the signed ballot 1212B with at least one vote, (iii) generates a pseudorandom identifier, (iv) encrypts the signed ballot 1212B and the pseudorandom identifier with the sponsoring entity public key to obtain an encrypted package 1214A and (v) communicates the encrypted package 1214A and an identity token of the user 102 that attests to a verified identity of the user 102 to the registrar device 1208 e.g. the relying party device 112. Thus, since the registrar 1204 receives the encrypted package 1214A that is encrypted with the sponsoring entity public key, and since the encrypted package 1214A can be decrypted by the sponsoring entity private key, which is known to the sponsoring entity 1202 but not to the registrar 1204, the registrar 1204 is able to verify the identity of the user 102, but unable to determine how the user 102 voted and the contents of the vote. In some embodiments, only the user 102 knows the pseudorandom identifier. In some embodiments, when the pseudorandom identifier is published by the sponsoring entity 1202 along with the ballot, only the user 102 is able to confirm that his/her vote was recorded correctly by the sponsoring entity 1202.

The registrar device 1208, e.g. the relying party device 112 (i) receives the encrypted package 1214A and the identity token of the user 102 that attests to the verified identity of the user 102 from the user device 104, (ii) verifies that the ballot 1212A is signed by the user 102 by verifying the identity token of the user 102 that attests to a verified identity of the user 102, (iii) communicates an encrypted ballot 1214B to the sponsoring entity device 1206. Thus, the registrar 1204 verifies the identity of the user 102 who has signed the ballot 1212A. The registrar 1204 is thus able to ensure that only eligible voters receive the ballot 1212A, and also verify the identity of each eligible voter who has signed the ballot 1212A. This prevents anyone other than eligible voters from casting a vote and getting it recorded. The registrar 1204 may calculate a total number of votes polled for the election and note down the number of votes in order to tally the total number of votes received. In some embodiments, the encrypted ballot 1214B does not include any information about the voter that will enable the sponsoring entity 1202 to associate the vote with the voter. Thus, the sponsoring entity 1202 is not capable of associating specific votes with specific voters. The embodiments herein hence solve the problem of the sponsoring entity 1202 being able to determine how a voter has voted, and/or tamper with the vote, which is a possibility with existing approaches.

In one existing approach, the ballot 1212A is placed inside a sleeve, and although the ballot 1212A does not contain information that identifies the voter, the sleeve has voter identity information. Hence, in this approach, just by removing the ballot 1212A from the sleeve and noting the voter identity information, it would be possible for the registrar 1204 to not only determine the identity of the voter who cast the vote, but also determine the contents of the vote. The embodiments overcome this drawback by ensuring that the registrar 1204 is unable to access the vote (by encrypting the ballot with the sponsoring entity public key) and ensuring that the sponsoring entity 1202 is unable to access the identity of the voter (by performing the voter identity verification only at the registrar device 1208). Thus, in some embodiments, the identity of the voter is separated from a content of a vote that is cast by the voter, while also ensuring that the voter is able to verify that his/her vote was recorded correctly.

The sponsoring entity device 1206 (i) receives the encrypted completed ballot 1214B from the registrar device 1208 e.g. the relying party device 112, (ii) the encrypted completed ballot 1214B using the sponsoring entity private key, (iii) publishing the ballot, the vote and the pseudorandom identifier associated with the vote in a public database 1216. The user 102 may use this information to verify their vote was properly recorded. In some embodiments, other than the voter are not able to identify the vote that was voted by the voter. The sponsoring entity 1202 may note down the number of votes. In some embodiments, the number of votes noted by the registrar 1204 and the sponsoring entity 1202 may be matched to ensure the registrar 1204 and the sponsoring entity 1202 have the same number of votes.

In some embodiments, a registrar code is written as a blockchain smart contract 1218 that is (i) open-source, and executed based on conditions specified in the blockchain smart contract 1218, which may be a smart contract. A smart contract is a computer protocol intended to digitally facilitate, verify, or enforce the negotiation or performance of a contract. Smart contracts allow the performance of credible transactions without third parties. Since transactions recorded in smart contracts are trackable and irreversible, they can be examined and verified to ensure that parties governed by the smart contract, such as the registrar 1204, execute transactions based on prescribed conditions specified in the blockchain smart contract 1218 e.g. when a properly signed message is sent to the blockchain smart contract 1218. Previously, a registrar may have been able to suppress certain votes from certain regions that are known to favor certain candidates, parties, and/or outcomes. However, when the transactions are specified in the open source blockchain contract, it is possible to examine the blockchain smart contract 1218 and verify that the registrar 1204 has indeed forwarded all the votes received by the registrar 1204 to the sponsoring entity 1202, and not added or subtracted any of those votes.

In some embodiments, the registrar 1204, e.g. the relying party 114 is governed by the blockchain smart contract 1218 by implementing a registrar code in the blockchain smart contract 1218.

An example pseudo code for the blockchain smart contract 1218

Registrar::InitiateVote (Ballot ballot; Table voter_table[ ])
{
For each voter vtr in voter_table[ ]
  {
  Send ballot to vtr:registered device;
  }
}
Registrar::ProcessReceivedVote (Ballot filledballot; voter vtr; Table voter_table[ ])
{
  If (vtr.id token exists in voter_table[ ].id token)
  {
  Send filledballot to vote_sponsor;
  }
  Else // this voter is not eligible to vote in this election
  {
Record filledballot, vtr into IneligibleVotes[ ]

In some embodiments, the blockchain smart contract 1218 may include an object in the form of a voter table. The voter table may include a voter identifier, such as a voter identification number, a social security number etc. The object may specify a state. The blockchain smart contract 1218 may also specify one or more methods that take inputs, such as the ballot, from the sponsoring entity 1202. The blockchain smart contract 1218 may also include a registrar code that specifies obtaining the ballot and sending it to each registered voter, verifying that the votes are received only from registered voters, and forwarding the votes that are received to the sponsoring entity 1202.

FIG. 13 is a voter table 1300 that is stored in the blockchain smart contract 1218 of FIG. 12 according to some embodiments herein. Each row of the voter table 1300 includes at least one voter identifier, e.g. a voter identifier 1302, and a device token 1304. The voter table 1300 may be represented as an object. The voter identifier 1302 may be a voter identification number, a social security number, etc. The device token 1304 is a unique identifier of a device that is associated with a voter, e.g. the user device 104 associated with the user 102 as shown in FIG. 1. The registrar 1204 may verify an identity of each eligible voter who has signed the ballot 1212A by verifying with the voter table 1300. The registrar 1204 communicates the ballot 1212A to a device (based on the corresponding device token 1204) associated with each eligible voter whose voter identifier 1302 is stored in the voter table 1300.

Figure 14A:
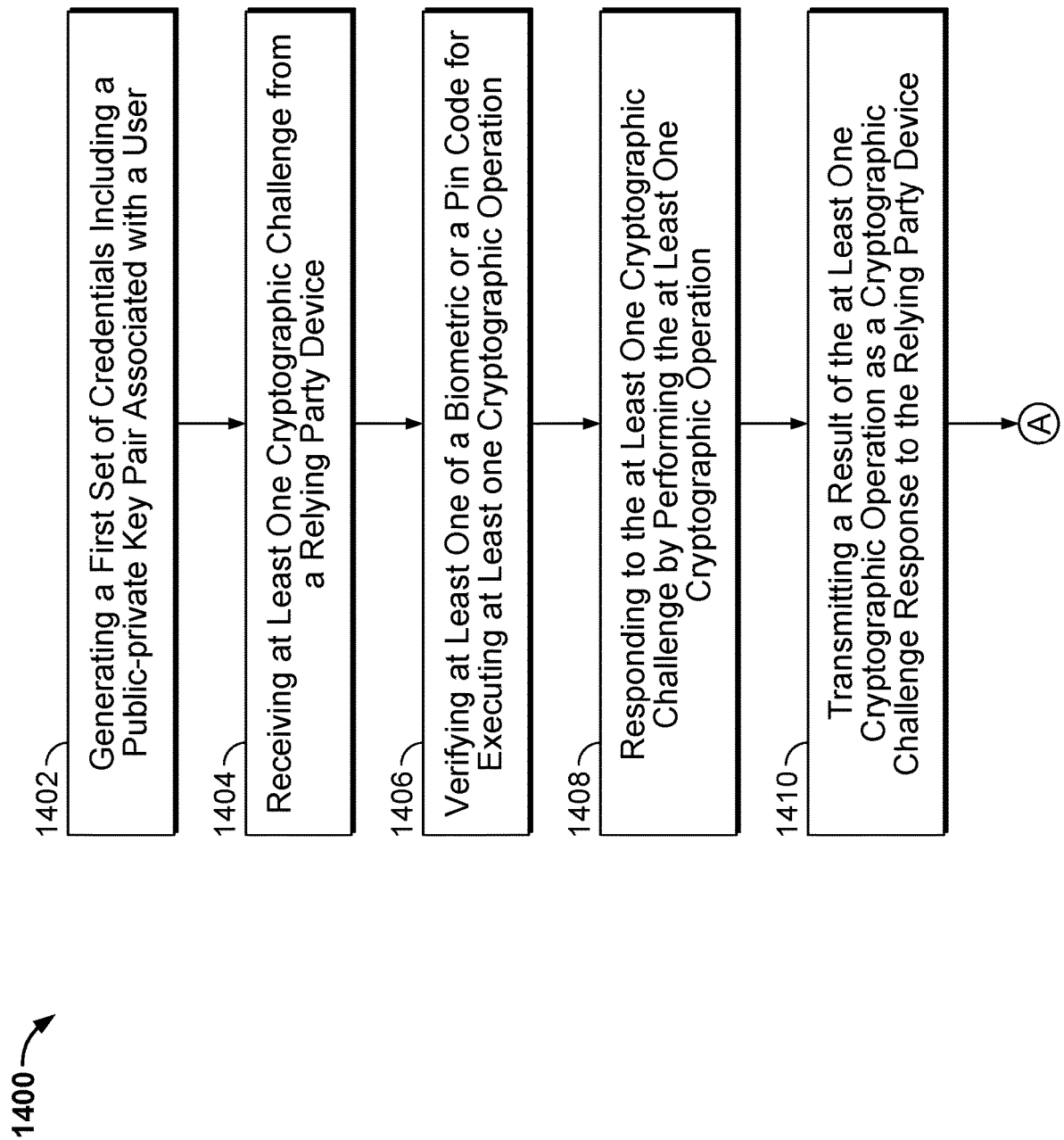
FIGS. 14A-14B are flow diagrams that illustrate a method for enabling a relying party device associated with a relying party to authenticate a user and verify an identity of the user according to some embodiments herein.
Figure 14B:
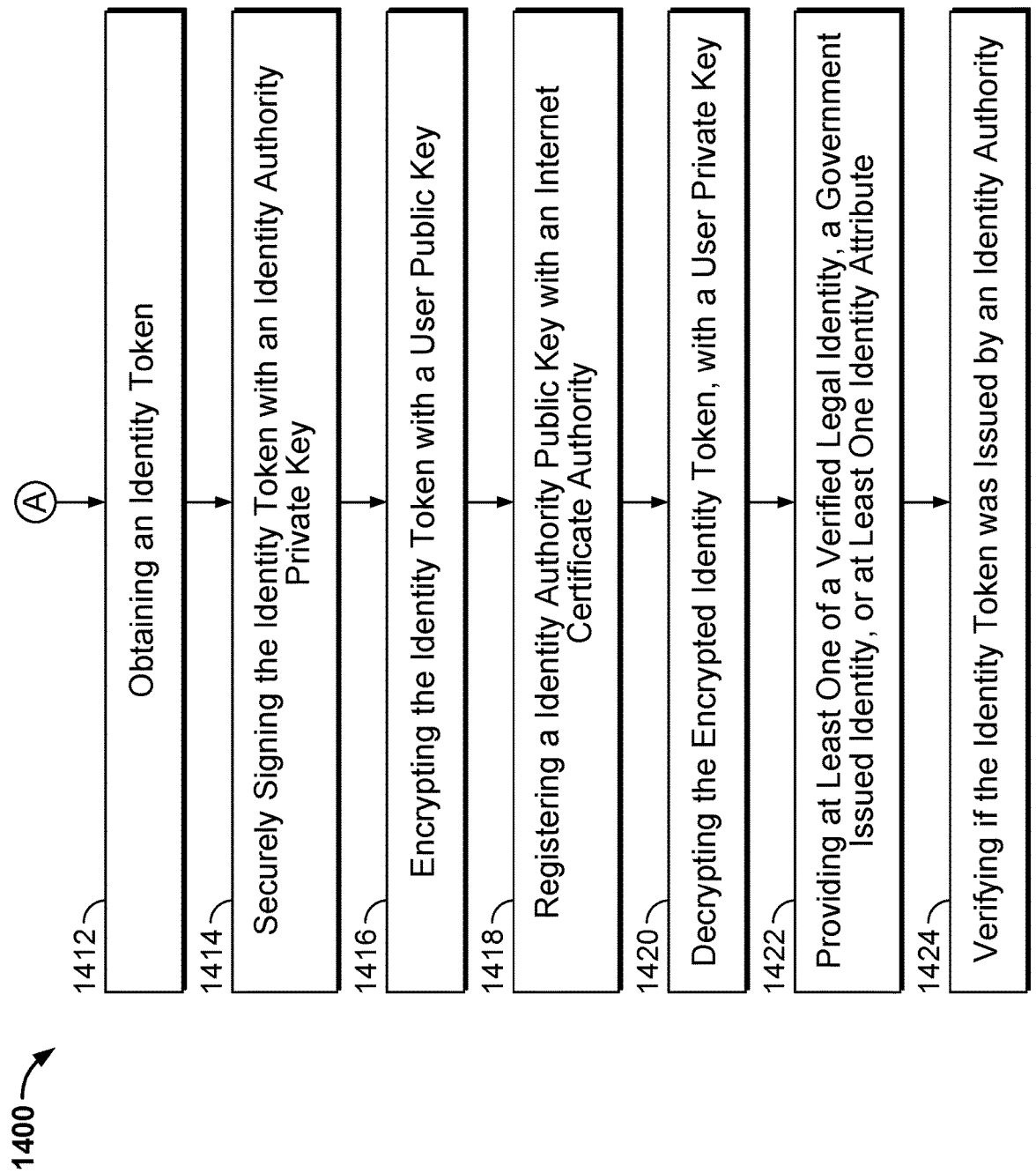

FIGS. 14A-14B are flow diagrams that illustrate a method 1400 for enabling the relying party device 112 associated with the relying party 114 to authenticate the user 102 and verify the identity of the user 102 according to some embodiments herein. FIG. 14A, illustrates the method 1400 for authenticating the user 102. At step 1402, the method 1400 includes generating a first set of credentials including a public-private key pair associated with the user 102 using a cryptographic processor on the user device 104 associated with the user 102. The public-private key pair includes a user public key and a user private key. The user private key is restricted to the cryptographic processor on the user device 104. At step 1404, the method 1400 includes receiving at least one cryptographic challenge from the relying party device 112 associated with the relying party 114. The at least one cryptographic challenge includes or is derived from a pseudorandom value. At step 1406, the method 1400 includes verifying at least one of a biometric or a PIN code by comparing the at least one of the biometric or the PIN code with at least one of a previously registered biometric associated with the user 102 or a previously registered PIN code associated with the user 102, and if the at least one of the biometric or the PIN code matches the at least one of the previously registered biometric associated with the user 102 or the previously registered PIN code associated with the user 102, making the user private key available for executing at least one cryptographic operation. At step 1408, the method 1400 includes responding the at least one cryptographic challenge by performing the at least one cryptographic operation on the cryptographic challenge using the user private key to form a result of the at least one cryptographic operation. At step 1410, the method 1400 includes transmitting the result of the at least one cryptographic operation as a cryptographic challenge response to the relying party device 112. The result is derived from or includes the pseudorandom value.

FIG. 14B illustrates the method 1400 for verifying the identity of the user 102. At step 1412, the method 1400 includes obtaining the identity token 106A from the identity authority 110. The identity authority 110 possesses an identity authority signature key pair that includes an identity authority public key and an identity authority private key. The identity token 106A includes the user public key, a unique identifier of the identity token 106A, and at least one identity attribute. At step 1414, the method 1400 includes securely signing the identity token 106A with the identity authority private key, by the identity authority device 108 associated with the identity authority 110. At step 1416, the method 1400 includes encrypting the identity token 106A with the user public key, by the identity authority device 108, to obtain an encrypted identity token. At step 1418, the method 1400 includes registering the identity authority public key with an internet certificate authority, by the identity authority device 108. The identity token securely attests to at least one of an identity document, a verified legal identity, a government issued identity, or the at least one identity attribute. At step 1420, the method 1400 includes decrypting the encrypted identity token, with the user private key, at the user device 104, to obtain the identity token 106A. At step 1422, the method 1400 includes providing at least one of the verified legal identity, the government issued identity, or the at least one identity attribute that the identity token 106B securely attests to, by the user device 104, to the relying party device 112. At step 1424, the method 1400 includes verifying with the internet certificate authority, by the relying party device 112, if the identity token 106B was issued by the identity authority 110.

Figure 15:
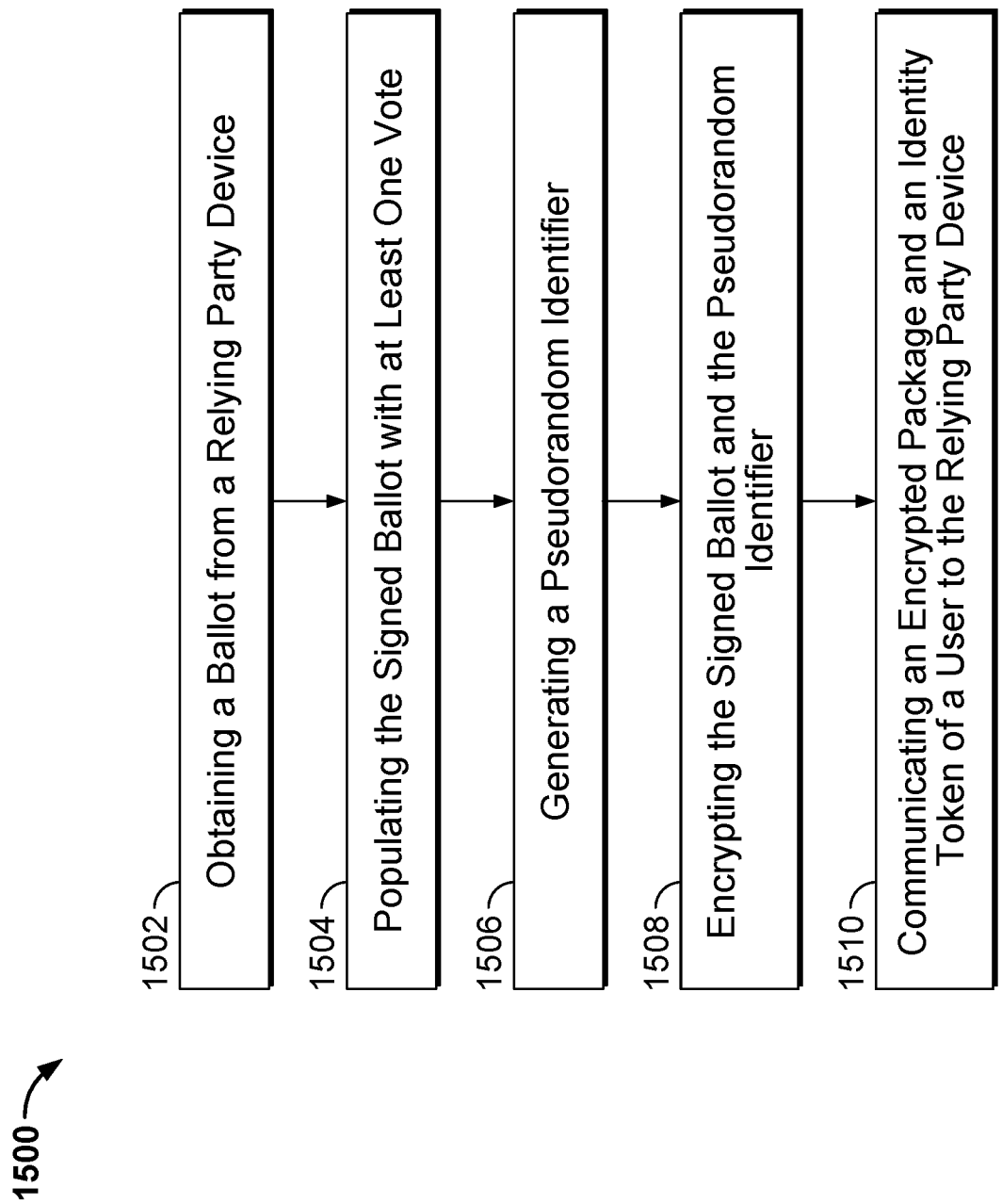
FIG. 15 is a method for encrypting a signed ballot and a pseudorandom identifier with a sponsoring entity public key to obtain an encrypted package at the user device according to some embodiments herein.

FIG. 15 is a method 1500 for encrypting the signed ballot 1212B and a pseudorandom identifier with a sponsoring entity public key to obtain an encrypted package at the user device 104 according to some embodiments herein. At step 1502, the method 1500 includes obtaining the signed ballot 1212B from the relying party device 112, at the user device 104. In some embodiments, the relying party device 112 is associated with the registrar 1204. In some embodiments, a ballot is generated by the sponsoring entity device 1206 associated with a sponsoring entity. In some embodiments, the sponsoring entity device 1206 is associated with the sponsoring entity public key and a sponsoring entity private key. In some embodiments, the ballot is digitally signed with the sponsoring entity private key to generate the signed ballot 1212A. At step 1504, the method 1500 includes populating the signed ballot 1212A with at least one vote. At step 1506, the method 1500 includes generating the pseudorandom identifier. At step 1508, the method 1500 includes encrypting the signed ballot 1212A and the pseudorandom identifier with the sponsoring entity public key to obtain the encrypted package 1214A. At step 1510, the method 1500 includes communicating the encrypted package 1214A and the identity token of the user 102 that attests to a verified identity of the user 102 from the user device 104 to the relying party device 112.

Figure 16:
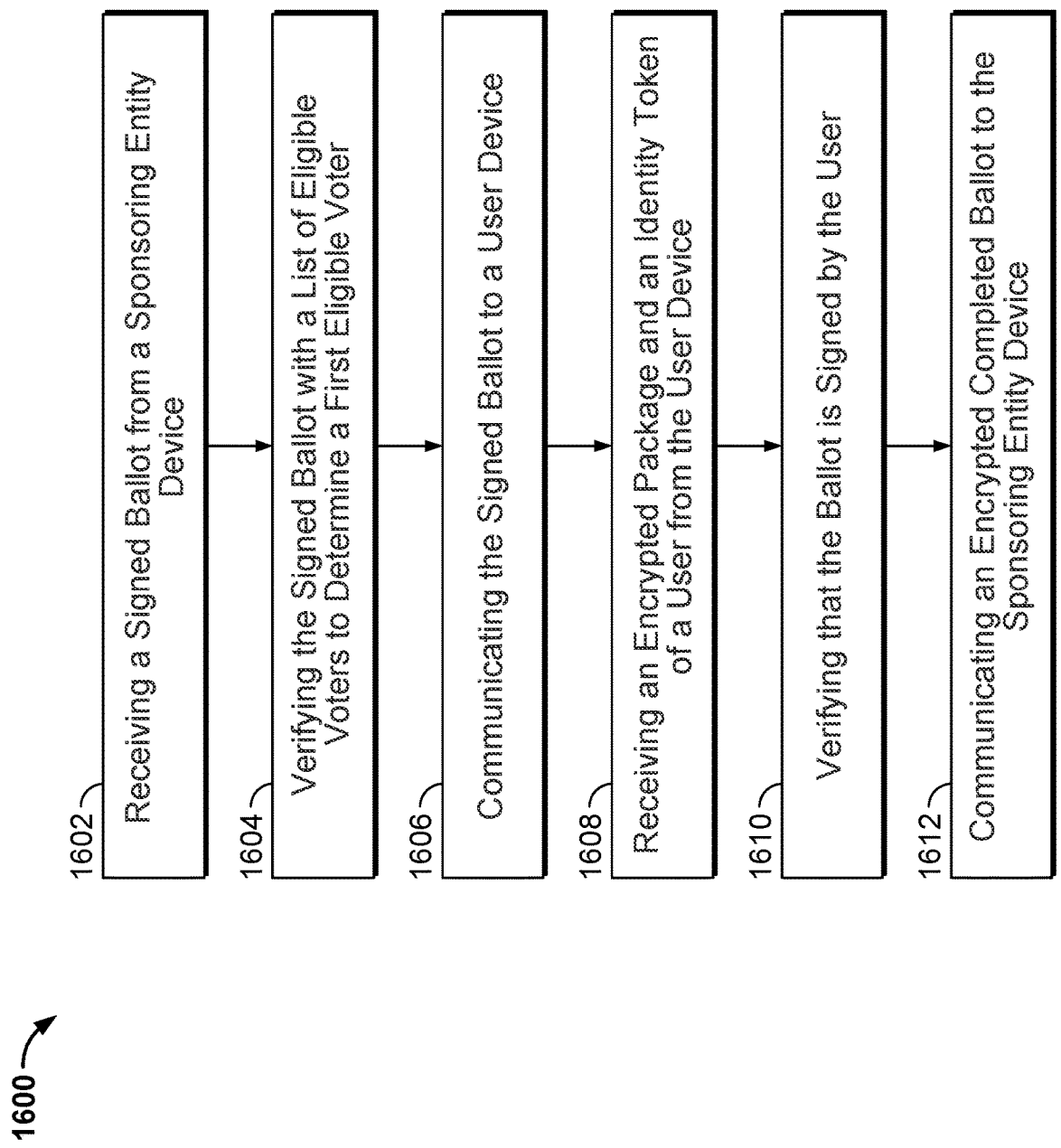
FIG. 16 is a method for verifying that the ballot is signed by the user by verifying the identity token of the user at the relying party device according to some embodiments herein.

FIG. 16 is a method 1600 for verifying that the ballot 1212A is signed by the user 102 by verifying an identity token of the user 102 at the relying party device 112 according to some embodiments herein. At step 1602, the method 1600 includes receiving the signed ballot 1212A from the sponsoring entity device 1206, at the relying party device 112. At step 1604, the method 1600 includes verifying the signed ballot 1212A with a list of eligible voters for an election that is stored in a relying party device database to determine a first eligible voter. In some embodiments, the first eligible voter is the user 102, and the first eligible voter is associated with the user device 104. At step 1606, the method 1600 includes communicating the signed ballot 1212A to the user device 104 associated with the first eligible voter. At step 1608, the method 1600 includes receiving the encrypted package 1214A and the identity token of the user 102 that attests to the verified identity of the user 102 from the user device 104. At step 1610, the method 1600 includes verifying that the ballot is signed by the user 102 by verifying the identity token of the user 102 that attests to a verified identity of the user 102. At step 1612, the method 1600 includes communicating the encrypted completed ballot 1214B to the sponsoring entity device 1206.

Figure 17:
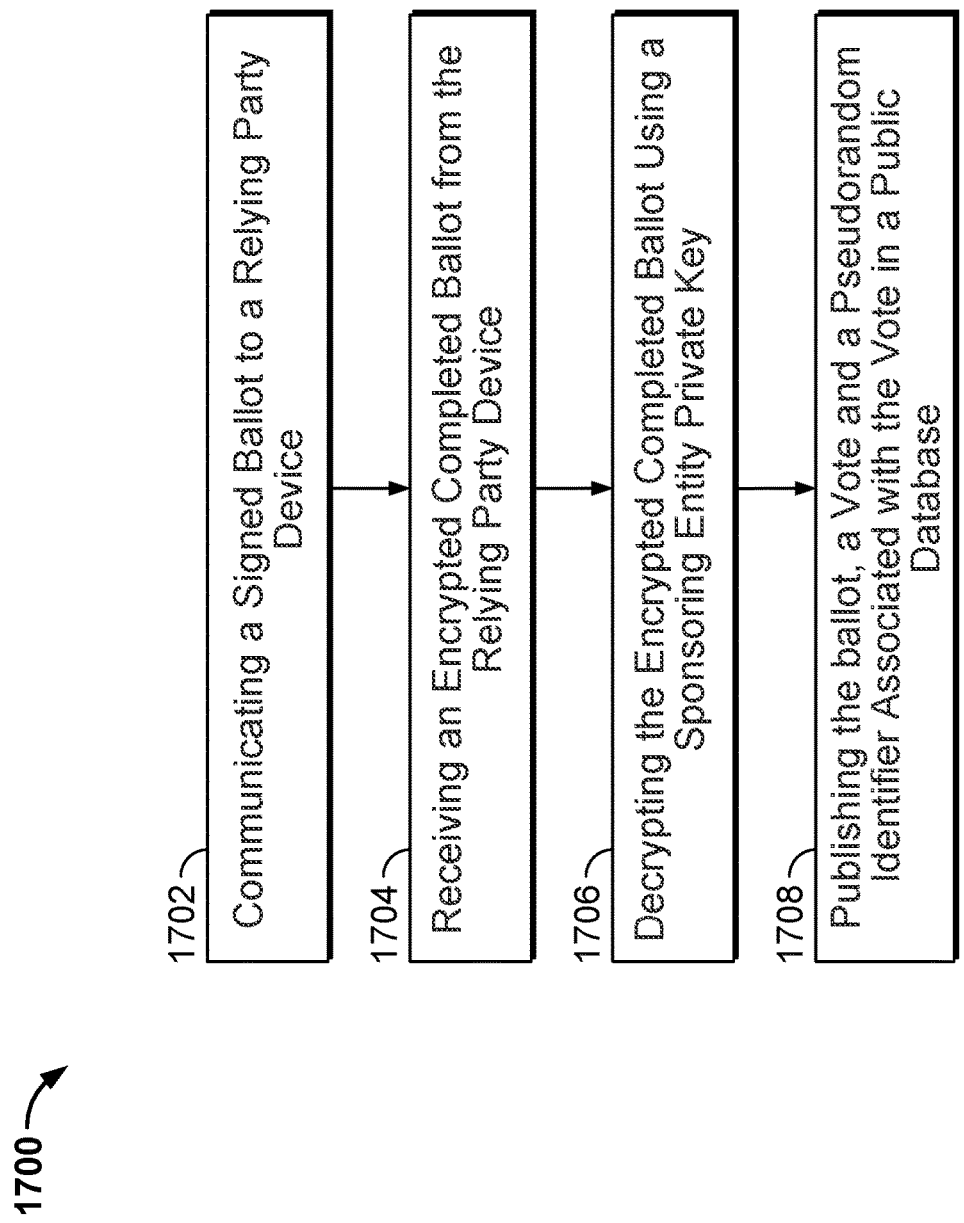
FIG. 17 is a method for decrypting an encrypted completed ballot using a sponsoring entity private key at a sponsoring entity device according to some embodiments herein.

FIG. 17 is a method 1700 for decrypting the encrypted completed ballot 1214B using a sponsoring entity private key at the sponsoring entity device 1206 according to some embodiments herein. At step 1702, the method 1700 includes communicating the signed ballot 1212A to the relying party device 112. At step 1704, the method 1700 includes receiving the encrypted completed ballot 1214B from the relying party device 112. At step 1706, the method 1700 includes decrypting the encrypted completed ballot 1214B using the sponsoring entity private key. At step 1708, the method 1700 includes publishing the ballot, the vote and the pseudorandom identifier associated with the vote in a public database 1216.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 18:
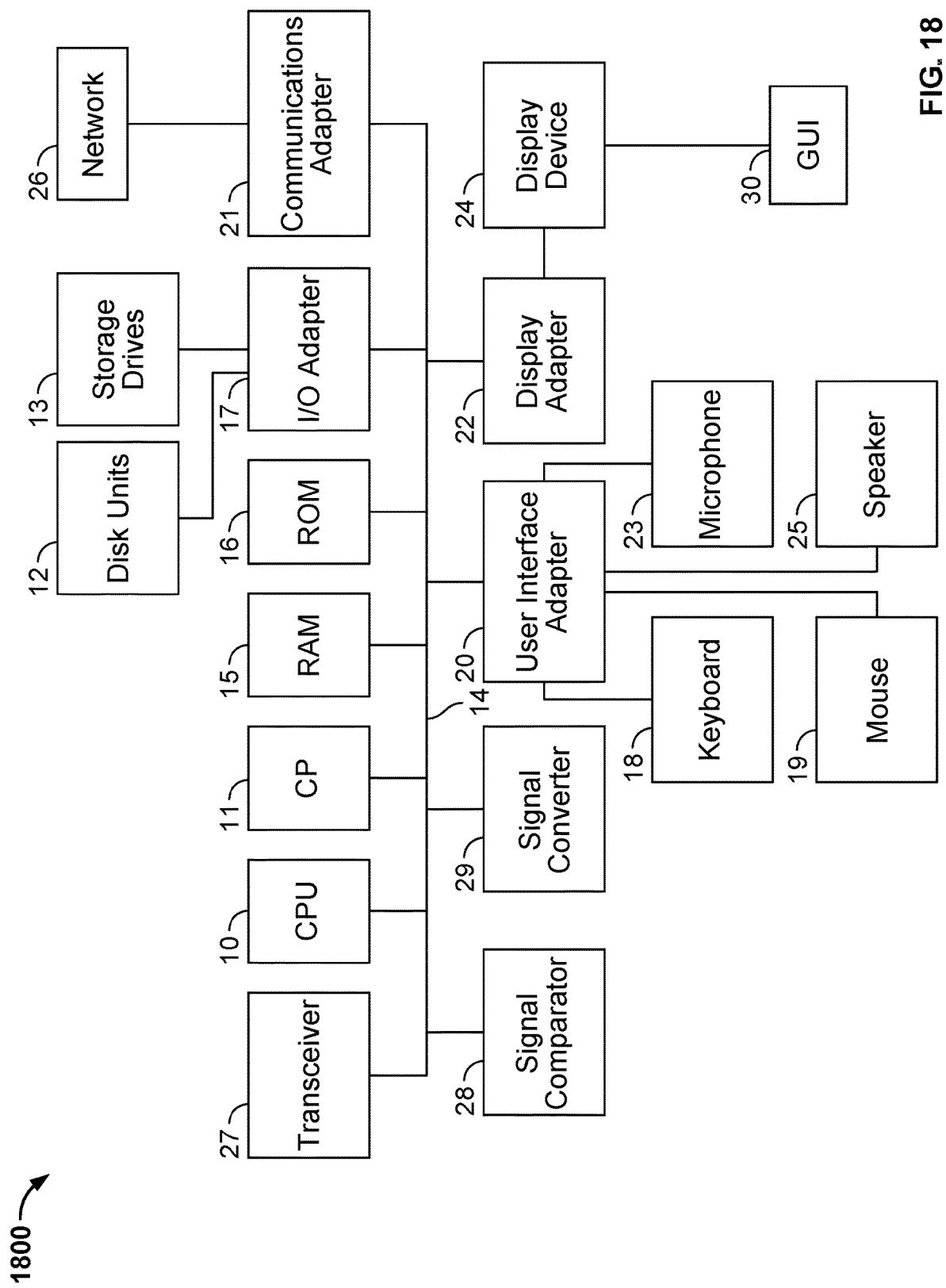
FIG. 18 is a block diagram of a schematic diagram of a device used in accordance with embodiments herein.

A representative hardware environment for practicing the embodiments herein is depicted in FIG. 18, with reference to FIGS. 1 through 17. This schematic drawing illustrates a hardware configuration of a server/computer system/user device in accordance with the embodiments herein. The user device 104 includes at least one processing device 10 and a cryptographic processor 11. The special-purpose CPU 10 and the cryptographic processor (CP) 11 may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The user device can read the inventive instructions on the program storage devices and follow these instructions to execute the methodology of the embodiments herein. The user device further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for enabling a relying party device associated with a relying party to verify a response of a user, the method comprising:

receiving a signed response request generated by a sponsoring entity device associated with a sponsoring entity, wherein the signed response request comprises a response request digitally signed with a sponsoring entity private key to generate the signed response request;

providing the signed response request to a user device, wherein the user device generates an encrypted package encrypted using a sponsoring entity public key, wherein the encrypted package includes the response request populated with at least one response and a pseudorandom identifier;

receiving the encrypted package from the user device;

determining that an identity of the user of the user device is verified; and in response to a determination that the identity of the user of the user device is verified, providing the encrypted package to the sponsoring entity device.

2. The processor-implemented method of claim 1, further comprising:

providing at least one cryptographic challenge to the user device, wherein the at least one cryptographic challenge includes or is derived from a pseudorandom value, wherein the user device:
  generates, using a cryptographic processor on the user device, a first set of credentials comprising a public-private key pair associated with the user, wherein the public-private key pair comprises a user public key and a user private key, wherein the user private key is restricted to the cryptographic processor on the user device;
  verifies at least one of a biometric or a PIN code by comparing the at least one of the biometric or the PIN code with at least one of a previously registered biometric associated with the user or a previously registered PIN code associated with the user, and in response to the at least one of the biometric or the PIN code matching the at least one of the previously registered biometric associated with the user or the previously registered PIN code associated with the user, makes the user private key available for executing at least one cryptographic operation; and
  responds to the at least one cryptographic challenge by performing the at least one cryptographic operation on the cryptographic challenge using the user private key to form a result of the at least one cryptographic operation; and
receiving the result of the at least one cryptographic operation as a cryptographic challenge response from the user device, wherein the result is derived from or includes the pseudorandom value;
obtaining an identity token from an identity authority, wherein the identity authority possesses an identity authority signature key pair that comprises an identity authority public key and an identity authority private key, wherein the identity token comprises the user public key, a unique identifier of the identity token, and at least one identity attribute;
securely signing the identity token with the identity authority private key, by an identity authority device associated with the identity authority;
encrypting the identity token with the user public key, by the identity authority device, to obtain an encrypted identity token; and
registering the identity authority public key with an internet certificate authority, by the identity authority device, wherein the identity token securely attests to at least one of an identity document, a verified legal identity, a government issued identity, or the at least one identity attribute.

3. The processor-implemented method of claim 2, further comprising:
  receiving at least one of the verified legal identity, the government issued identity, or the at least one identity attribute that the identity token securely attests to from the user device, wherein the user device decrypts the encrypted identity token with the user private key to obtain the identity token; and
  verifying with the internet certificate authority in response to the identity token being issued by the identity authority.

4. The processor-implemented method of claim 2, wherein the at least one identity attribute is selected from a photograph of the user, a video of the user, an information identifier in the identity document, an information identifier in the verified legal identity, and an information identifier in the government issued identity, wherein the identity document is selected from a student identity proof, an employment proof, or an insurance card, and the government issued identity is selected from a voter identity document or a passport.

5. The processor-implemented method of claim 1, further comprising:
  providing at least one cryptographic challenge to the user device, wherein the at least one cryptographic challenge includes or is derived from a pseudorandom value, wherein the user device:
    generates, using a cryptographic processor on the user device, a first set of credentials comprising a public-private key pair associated with the user, wherein the public-private key pair comprises a user public key and a user private key, wherein the user private key is restricted to the cryptographic processor on the user device;
    verifies at least one of a biometric or a PIN code by comparing the at least one of the biometric or the PIN code with at least one of a previously registered biometric associated with the user or a previously registered PIN code associated with the user, and in response to the at least one of the biometric or the PIN code matching the at least one of the previously registered biometric associated with the user or the previously registered PIN code associated with the user, makes the user private key available for executing at least one cryptographic operation; and
    responds to the at least one cryptographic challenge by performing the at least one cryptographic operation on the cryptographic challenge using the user private key to form a result of the at least one cryptographic operation; and
  receiving the result of the at least one cryptographic operation as a cryptographic challenge response from the user device, wherein the result is derived from or includes the pseudorandom value.

6. The processor-implemented method of claim 5, further comprising:
  storing a record on an alert database, wherein the record is signed using the user private key; and
  providing a transaction request on behalf of the user associated with the record on the alert database;
  sending the cryptographic challenge response to the user device associated with the first set of credentials; and
  authorizing the transaction request in response to the transaction request being signed using the first set of credentials.

7. The processor-implemented method of claim 5, wherein providing the at least one cryptographic challenge comprises providing an encrypted pseudorandom value that is derived from the pseudorandom value by encrypting the pseudorandom value with the user public key from an identity token, wherein performing the at least one cryptographic operation on the at least one cryptographic challenge for responding to the at least one cryptographic challenge comprises decrypting the encrypted pseudorandom value, and wherein the result of the at least one cryptographic operation performed on the cryptographic challenge comprises the pseudorandom value that is received as the cryptographic challenge response.

8. The processor implemented method of claim 5, wherein providing the at least one cryptographic challenge comprises providing a pseudorandom value, wherein performing the at least one cryptographic operation on the at least one cryptographic challenge for responding to the at least one cryptographic challenge comprises encrypting the pseudorandom value, and wherein the result of the of the at least one cryptographic operation performed on the at least one cryptographic challenge comprises an encrypted pseudorandom value, wherein decrypting the encrypted pseudorandom value from the cryptographic challenge response obtains the pseudorandom value.

9. The processor-implemented method of claim 5, wherein providing the at least one cryptographic challenge comprises providing a pseudorandom value, wherein performing the at least one cryptographic operation on the at least one cryptographic challenge for responding to the at least one cryptographic challenge comprises signing the pseudorandom value with the user private key, and wherein the result of the of the at least one cryptographic operation performed on the at least one cryptographic challenge comprises a signed pseudorandom value, wherein a signature of the pseudorandom value is verified from the cryptographic challenge response.

10. The processor-implemented method of claim 5, wherein an identity authority retains a copy of an identity token, and at least one identity attribute of the identity token is unpublished on a blockchain.

11. The processor-implemented method of claim 5, further comprising:
    implementing a blockchain smart contract that is written in a native programming language of the blockchain that verifies a digital signature that is generated on the user device with the cryptographic process of the user device using the user private key, wherein the first set of credentials enable the user to sign at least one transaction on the blockchain.

12. The processor-implemented method of claim 5, wherein the at least one cryptographic challenge is communicated to the user device by uniquely identifying the user device based on a 1-1 mapping from the user public key to the user device.

13. The processor-implemented method of claim 5, further comprising registering the user public key on a public blockchain, or registering the user public key on a permissioned blockchain.

14. The processor-implemented method of claim 5, further comprising:
    registering a credential revocation list contract with a blockchain, wherein the credential revocation list contract enables the first set of credentials generated on the user device to be revoked by a second set of credentials generated on a second user device.

15. The processor-implemented method of claim 14, wherein the credential revocation list contract comprises a revokee table that stores at least one public key of a revokee device and at least one public key of a corresponding authorized revoker device wherein if a registered authorized revoker device calls the credential revocation list contract to revoke credentials of the revokee device, a revocation transaction is digitally signed and recorded on the blockchain, and a revocation message is recorded against a public key address of the revokee device.

16. The processor-implemented method of claim 5, further comprising registering an identity token revocation list contract with a blockchain, wherein an identity authority sends a message to a user public key address to which the identity token was issued, to revoke the identity token, wherein the message sent by the identity authority comprises a token id of the identity token.

17. The processor-implemented method of claim 1, wherein the signed response request comprises a signed ballot, wherein a blockchain smart contract implements a registrar code in the blockchain smart contract, wherein the blockchain smart contract comprises:
    a voter table that is represented as an object, wherein each row of the voter table comprises at least one voter identifier; and
    the signed ballot obtained as an input from the sponsoring entity.

18. The processor-implemented method of claim 17, wherein the response to the response request comprises a vote, wherein the registrar code specifies:
    sending the signed ballot to a registered voter for the signed ballot;
    verifying that the vote is received from the registered voter; and
    forwarding the vote to the sponsoring entity.

19. The processor-implemented method of claim 1, wherein the signed response request is a signed ballot.

20. The processor-implemented method of claim 1, further comprising:
    receiving the signed response request from the sponsoring entity device;
    verifying the signed response request with a list of eligible that is stored in a relying party device database to determine a first eligible responder, wherein the first eligible responder is the user, and wherein the first eligible responder is associated with the user device;
    communicating the signed response request to the user device associated with the first eligible responder;
    receiving the encrypted package and an identity token of the user that attests to the verified identity of the user from the user device;
    verifying that the response request is signed by the user by verifying the identity token of the user that attests to a verified identity of the user; and
    communicating an encrypted completed response request to the sponsoring entity device.

21. The processor-implemented method of claim 1, further comprising:
    receiving, by the sponsoring entity device, the encrypted package from the relying party device;
    decrypting the encrypted package using the sponsoring entity private key; and
    publishing the response request, the response, and the pseudorandom identifier associated with the response in a public database.

22. The processor-implemented method of claim 5, further comprising:
    extracting an identity token from the electronic document, wherein the user device embeds the identity token into the electronic document and cryptographically signs the electronic document with the user private key, wherein the at least one cryptographic challenge is sent to the user device associated with the user public key to verify that the user public key associated with the identity token corresponds to the user private key used to sign the electronic document.

23. A computer program product for enabling a relying party device associated with a relying party to verify a response of a user, the computer program product being embodied in a non-transitory computer readable storage medium and comprising computer instructions for:
    receiving a signed response request generated by a sponsoring entity device associated with a sponsoring entity, wherein the signed response request comprises a response request digitally signed with a sponsoring entity private key to generate the signed response request;

providing the signed response request to a user device, wherein the user device generates an encrypted package encrypted using a sponsoring entity public key, wherein the encrypted package includes the response request populated with at least one response and a pseudorandom identifier;

receiving the encrypted package from the user device;

determining that an identity of the user of the user device is verified; and in response to a determination that the identity of the user of the user device is verified, providing the encrypted package to the sponsoring entity device.

24. A system for enabling a relying party device associated with a relying party to verify a response of a user, comprising:

a processor configured to:

receive a signed response request generated by a sponsoring entity device associated with a sponsoring entity, wherein the signed response request comprises a response request digitally signed with a sponsoring entity private key to generate the signed response request;

provide the signed response request to a user device, wherein the user device generates an encrypted package encrypted using a sponsoring entity public key, wherein the encrypted package includes the response request populated with at least one response and a pseudorandom identifier;

receive the encrypted package from the user device;

determine that an identity of the user of the user device is verified; and in response to a determination that the identity of the user of the user device is verified, provide the encrypted package to the sponsoring entity device; and a memory coupled to the processor and configured to provide the processor with instructions.

\* \* \* \* \*